(12) United States Patent
Fujimoto et al.

(10) Patent No.: US 9,147,993 B2
(45) Date of Patent: Sep. 29, 2015

(54) MASTER OSCILLATOR SYSTEM AND LASER APPARATUS

(75) Inventors: Junichi Fujimoto, Tochigi (JP); Takahito Kumazaki, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 145 days.

(21) Appl. No.: 13/602,547

(22) Filed: Sep. 4, 2012

(65) Prior Publication Data

US 2013/0064258 A1 Mar. 14, 2013

(30) Foreign Application Priority Data

Sep. 8, 2011 (JP) ................................ 2011-196231
Jul. 12, 2012 (JP) ................................ 2012-156767

(51) Int. Cl.
| | | |
|---|---|---|
| H01S 3/08 | (2006.01) | |
| H01S 3/104 | (2006.01) | |
| H01S 3/097 | (2006.01) | |
| H01S 3/106 | (2006.01) | |
| H01S 3/225 | (2006.01) | |
| H01S 3/101 | (2006.01) | |
| H01S 3/23 | (2006.01) | |

(52) U.S. Cl.
CPC ......... *H01S 3/08009* (2013.01); *H01S 3/08004* (2013.01); *H01S 3/097* (2013.01); *H01S 3/104* (2013.01); *H01S 3/106* (2013.01); *H01S 3/0804* (2013.01); *H01S 3/101* (2013.01); *H01S 3/225* (2013.01); *H01S 3/2251* (2013.01); *H01S 3/2256* (2013.01); *H01S 3/2366* (2013.01)

(58) Field of Classification Search
CPC . H01S 3/08009; H01S 3/08004; H01S 3/106; H01S 3/104; H01S 3/101; H01S 3/097; H01S 3/2366; H01S 3/225; H01S 3/2251; H01S 3/2256
USPC ................... 371/102, 101, 100, 97, 92, 38.01
See application file for complete search history.

(56) References Cited

U.S. PATENT DOCUMENTS

| | | | | |
|---|---|---|---|---|
| 6,393,037 | B1 * | 5/2002 | Basting et al. ................... | 372/20 |
| 6,738,410 | B2 * | 5/2004 | Partlo et al. .................... | 372/100 |
| 6,856,638 | B2 * | 2/2005 | Aab et al. ......................... | 372/57 |
| 6,859,305 | B2 | 2/2005 | Chen et al. | |
| 7,088,758 | B2 | 8/2006 | Sandstrom et al. | |
| 7,154,928 | B2 | 12/2006 | Sandstrom et al. | |
| 2006/0239324 | A1 * | 10/2006 | Akagawa et al. ............... | 372/99 |

FOREIGN PATENT DOCUMENTS

JP 4358052 11/2009

* cited by examiner

*Primary Examiner* — Kinam Park
(74) *Attorney, Agent, or Firm* — Kratz, Quintos & Hanson, LLP

(57) ABSTRACT

A master oscillator system may include a grating that functions as one of a plurality of resonator mirrors in an optical resonator, an optical element disposed within an optical path between the plurality of resonator mirrors, and an attitude control mechanism that adjusts an angle at which laser light traveling within the optical resonator is incident on the grating by adjusting the attitude of the optical element.

7 Claims, 21 Drawing Sheets ated in FIG. 16.

MASTER OSCILLATOR SYSTEM AND LASER APPARATUS

CROSS-REFERENCE TO RELATED APPLICATIONS

The present application claims priority from Japanese Patent Application No. 2011-196231 filed Sep. 8, 2011, and Japanese Patent Application No. 2012-156767 filed Jul. 12, 2012.

BACKGROUND

1. Technical Field

The present disclosure relates to master oscillator systems and laser apparatuses.

2. Related Art

The miniaturization and increased levels of integration of semiconductor integrated circuits has led to a demand for increases in the resolutions of semiconductor exposure devices (called "exposure devices" hereinafter). Accordingly, advances are being made in the reduction of the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

Immersion exposure, in which the apparent wavelength of an exposure light source is reduced by filling the space between the exposure lens of an exposure device and a wafer with a liquid and changing the refractive index, is being researched as a next-generation exposure technique. In the case where immersion exposure is carried out using an ArF excimer laser apparatus as the exposure light source, the wafer is irradiated with ultraviolet light at a wavelength of 134 nm within the liquid. This technique is referred to as ArF immersion exposure (or ArF immersion lithography).

The natural oscillation amplitude of a KrF excimer laser apparatus, an ArF excimer laser apparatus, or the like is as wide as 350-400 pm. Accordingly, there are cases where chromatic aberration will occur if a projection lens is used in the exposure device, leading to a drop in the resolution. Accordingly, it is necessary to narrow the spectral bandwidth (spectral width) of the laser beam emitted from the gas laser apparatus until the chromatic aberration reaches a level that can be ignored. In recent years, the spectral width has been narrowed by providing a line narrow module having a line narrowing element (an etalon, a grating, or the like) within the laser resonator of the gas laser apparatus. A laser apparatus that narrows the spectral width in this manner is called a narrow-band laser apparatus.

SUMMARY

A master oscillator system according to an aspect of the present disclosure may include: a grating that functions as one of a plurality of resonator mirrors in an optical resonator; an optical element disposed within an optical path between the plurality of resonator mirrors; and an attitude control mechanism that adjusts the attitude of the optical element.

A master oscillator system according to another aspect of the present disclosure may be the master oscillator system according to the aforementioned aspect, in which the optical element is a prism. In addition, the attitude control mechanism may adjust the attitude of the prism so that an axis at which two surfaces including two entry/exit surfaces, respectively, of the laser light in the prism intersect is tilted.

A laser apparatus according to another aspect of the present disclosure may include the aforementioned master oscillator system and an amplifying apparatus that amplifies laser light outputted from the master oscillator system.

BRIEF DESCRIPTION OF THE DRAWINGS

Exemplary embodiments of the present disclosure will be described hereinafter with reference to the appended drawings.

DETAILED DESCRIPTION

Figure 1:
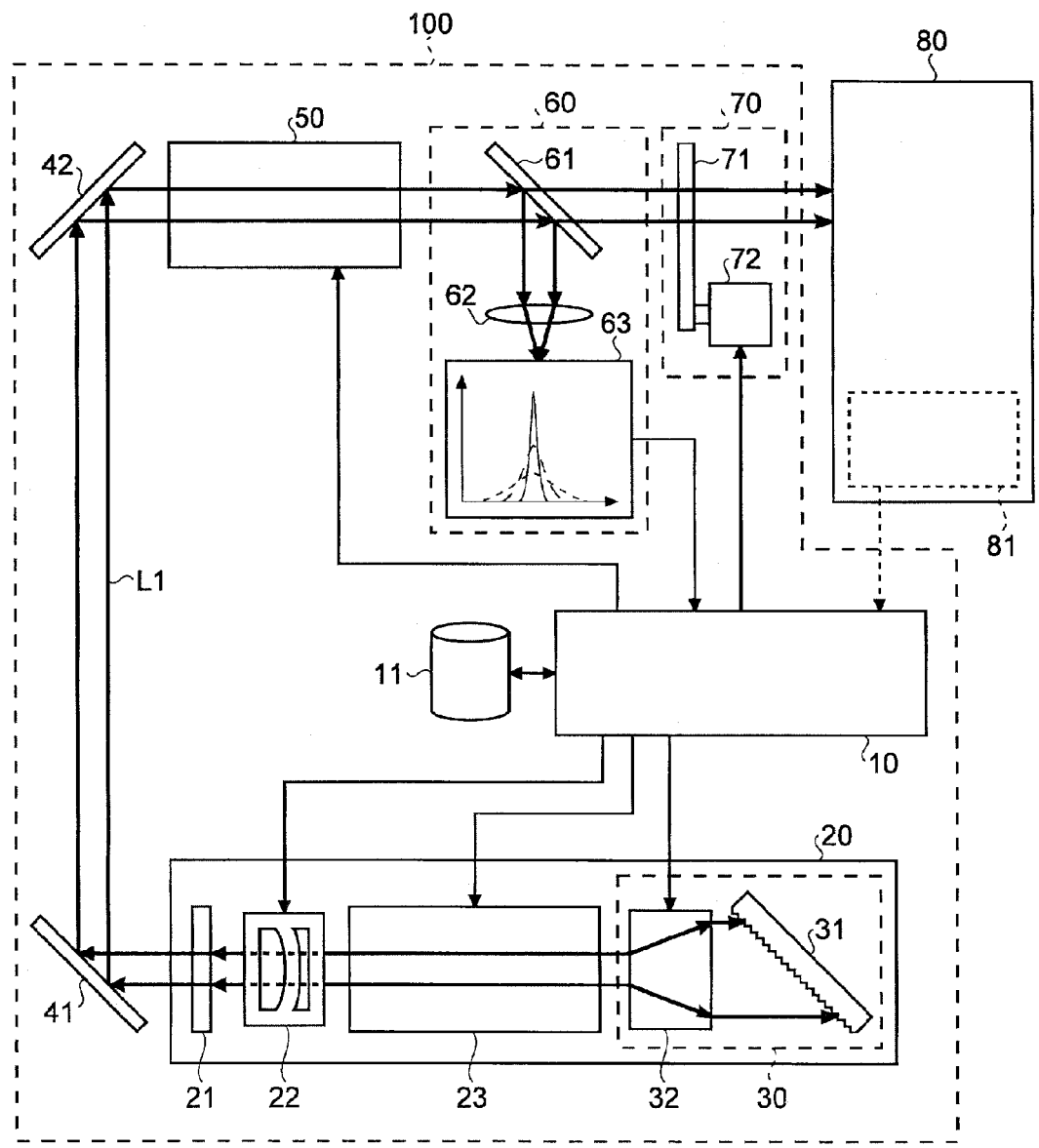
FIG. 1 schematically illustrates an example of the configuration of a laser apparatus according to an embodiment.

Embodiments of the present disclosure will be described in detail hereinafter with reference to the drawings. The embodiments described hereinafter indicate examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted. The following descriptions will be given according to the order of contents indicated below.

CONTENTS

1. Outline
2. Explanation of Terms
3. Laser Apparatus
   3.1 Configuration
   3.2 Operations
   3.3 Effects
4. Narrow-Band Laser Apparatus (Master Oscillator System)
   4.1 Line Narrow Module
      4.1.1 Line Narrow Module in which Prism Attitude Can Be Adjusted
         4.1.1.1 Mechanism for Adjusting Prism Attitude
            4.1.1.1.1 First Example
            4.1.1.1.2 Second Example
      4.1.2 Narrow-Band Laser Apparatus Including Mechanism for Changing Magnification Rate by Replacing Prisms
         4.1.2.1 First Example
            4.1.2.1.1 Beam Width Tuning Unit
               4.1.2.1.1.1 First Example
               4.1.2.1.1.2 Second Example
         4.1.2.2 Second Example
            4.1.2.2.1 Beam Width Tuning Unit
               4.1.2.2.1.1 First Example
               4.1.2.2.1.2 Second Example
         4.1.2.3 Third Example CONTENTS -continued 4.1.2.4 Fourth Example
            4.1.2.4.1 When Single Prism Can Be Replaced
            4.1.2.4.2 When Two or More Prisms Can Be Replaced (No. 1)
            4.1.2.4.3 When Two or More Prisms Can Be Replaced (No. 2)
            4.1.2.4.4 When Non-moving Prism Is Used as Beam Width Tuner
   4.2 Wavefront Tuning Unit
7. Other
   7.1 Amplifying Apparatus
      7.1.1 Embodiment Including Fabry-Perot Resonator
      7.1.2 Embodiment Including Ring Resonator
   7.2 Spectrum detector
      7.2.1 Monitor Etalon Spectroscope
      7.2.2 Grating-Type Spectroscope
   7.3 Spectral bandwidth E95

1. Outline

The embodiments illustrated hereinafter as examples can control the attitude of an optical element disposed within an optical resonator of a master oscillator. Through this, stable laser oscillation can be realized.

2. Explanation of Terms

Next, terms used in the present disclosure will be defined. "Upstream" refers to a side that is closer to a light source along an optical path of laser light. Likewise, "downstream" refers to a side that is closer to an exposure device along the optical path of laser light. "Prism" refers to an element, having a triangular column shape or a shape similar thereto, through which light including laser light can pass. It is assumed that the base surface and the top surface of the prism are triangular or a shape similar thereto. The three surfaces of the prism that intersect with the base surface and the top surface at approximately 90° are referred to as side surfaces. In the case of a right-angled prism, the surface that does not intersect with the other two of the side surfaces at 90° is referred to as a sloped surface. Note that a prism whose shape has been changed by shaving the apex of the prism or the like can also be included as a prism in the present descriptions. "Optical axis" may be an axis that follows the direction of travel of the laser light and passes through approximately the center of a cross-section of the laser light beam.

3. Laser Apparatus

A laser apparatus according to an embodiment of the present disclosure will be described in detail hereinafter with reference to the drawings. The following embodiments describe an example of a laser apparatus including a narrow-band laser apparatus as a master oscillator system.

3.1 Configuration

FIG. 1 schematically illustrates an example of the configuration of the laser apparatus according to the embodiment. A laser apparatus 100 may be a laser apparatus used for semiconductor exposure. The laser apparatus 100 may be a two-stage laser apparatus including an oscillation stage (master oscillator) and an amplification stage (amplifying apparatus).

As shown in FIG. 1, the laser apparatus 100 may include a controller 10, a master oscillator system 20, an amplifying apparatus 50, and a spectrum detection unit 60. The laser apparatus 100 may further include an optical system such as high-reflecting mirrors 41 and 42 and a shutter mechanism 70. The laser apparatus 100 may further include a storage unit 11 connected to the controller 10.

The controller 10 may control the laser apparatus 100 as a whole. The controller 10 may be connected to the master oscillator system 20. In addition, the controller 10 may be connected to the amplifying apparatus 50, the spectrum detection unit 60, and the shutter mechanism 70. The controller 10 may further be connected to a controller 81 of an exposure device 80.

The master oscillator system 20 may output laser light L1. The laser light L1 may be pulsed light.

The optical system such as the high-reflecting mirrors 41 and 42 may be disposed within the optical path between the master oscillator system 20 and the amplifying apparatus 50. The amplifying apparatus 50 may amplify the laser light L1 that enters through the optical system. The amplifying apparatus 50 may contain a gain medium such as an excimer gas in its interior. The amplifying apparatus 50 may operate under the control of the controller 10.

The spectrum detection unit 60 may be disposed in the optical path downstream from the amplifying apparatus 50. The spectrum detection unit 60 may include a beam splitter 61, a focusing lens 62, and a spectrum detector 63. The beam splitter 61 may be disposed in the optical path of the laser light L1 outputted from the amplifying apparatus 50. The focusing lens 62 may be disposed in the optical path of the laser light L1 split by the beam splitter 61. An input portion of the spectrum detector 63 may be disposed at a focus position, or in the vicinity of the focus position, of the focusing lens 62. The spectrum detector 63 may detect a spectral bandwidth from a spectral waveform of inputted laser light L1. The spectrum detector 63 may output the detected spectral bandwidth of inputted laser light L1 to the controller 10.

The shutter mechanism 70 may be disposed in the optical path downstream from the spectrum detection unit 60. The shutter mechanism 70 may include a shutter 71 and a driving mechanism 72. The driving mechanism 72 may insert or remove the shutter 71 into or from the optical path of the laser light L1. The driving mechanism 72 may operate under the control of the controller 10. The laser light L1 that passes through the shutter mechanism 70 when the shutter 71 is in an open state may be led to the exposure device 80.

3.2 Operations

Next, the general operations of the laser apparatus 100 illustrated in FIG. 1 will be described. The controller 10 may receive, from the controller 81 of the exposure device 80, an exposure command requesting the laser light L1 for exposure to be outputted. This exposure command may include a spectral bandwidth target value required for the laser light L1 (a target spectral bandwidth). The controller 10 may drive the shutter mechanism 70 and close the shutter 71 upon receiving the exposure command. Meanwhile, the controller 10 may drive a wavefront tuning unit 22 and a beam width tuning unit 32 so that the spectral bandwidth of the laser light L1 becomes the requested target spectral bandwidth. The storage unit 11 may store a control value of the wavefront tuning unit 22 and/or the beam width tuning unit 32 in association with the target spectral bandwidth. The control value and the target spectral bandwidth may be managed in a control table data format. Alternatively, the storage unit 11 may hold data such as functions, parameters, and so on for calculating the control value from the target spectral bandwidth. Using the functions, parameters, or the like read out from the storage unit 11, the controller 10 may calculate the control value for obtaining the target spectral bandwidth. The controller 10 may send the obtained control value to the wavefront tuning unit 22 and the beam width tuning unit 32 as appropriate. In addition, the controller 10 may drive an amplifier 23 in the master oscillator system 20 to a pumped state. Through this, the laser light L1 whose spectral bandwidth has been approximately tuned to the target spectral bandwidth can be outputted from the master oscillator system 20.

The controller 10 may drive the amplifying apparatus 50 to a pumped state in synchronization with laser oscillation performed by the master oscillator system 20. Through this, the laser light L1 outputted from the master oscillator system 20 can be amplified by the amplifying apparatus 50.

The amplified laser light L1 may be incident on the beam splitter 61 of the spectrum detection unit 60. The spectrum detection unit 60 may detect a spectral bandwidth of the amplified laser light L1. The detected spectral bandwidth may be sent to the controller 10. The controller 10 may perform feedback control on at least one of the wavefront tuning unit 22 and the beam width tuning unit 32 so that the detected spectral bandwidth approaches the target spectral bandwidth.

3.3 Effects

As described thus far, the controller 10 may, upon receiving the target spectral bandwidth from the exposure device 80, find the control values of the wavefront tuning unit 22 and the beam width tuning unit 32 for obtaining the target spectral bandwidth by using data within the storage unit 11, and may then send those control values to the wavefront tuning unit 22 and the beam width tuning unit 32. Through this, the master oscillator system 20 can quickly be adjusted to a state capable of oscillating approximately at the target spectral bandwidth. In addition, by the controller 10 performing feedback control on the master oscillator system 20 based on the spectral bandwidth detected by the spectrum detection unit 60, the master oscillator system 20 can oscillate at the target spectral bandwidth in a stable manner.

4. Narrow-Band Laser Apparatus (Master Oscillator System)

Figure 2:
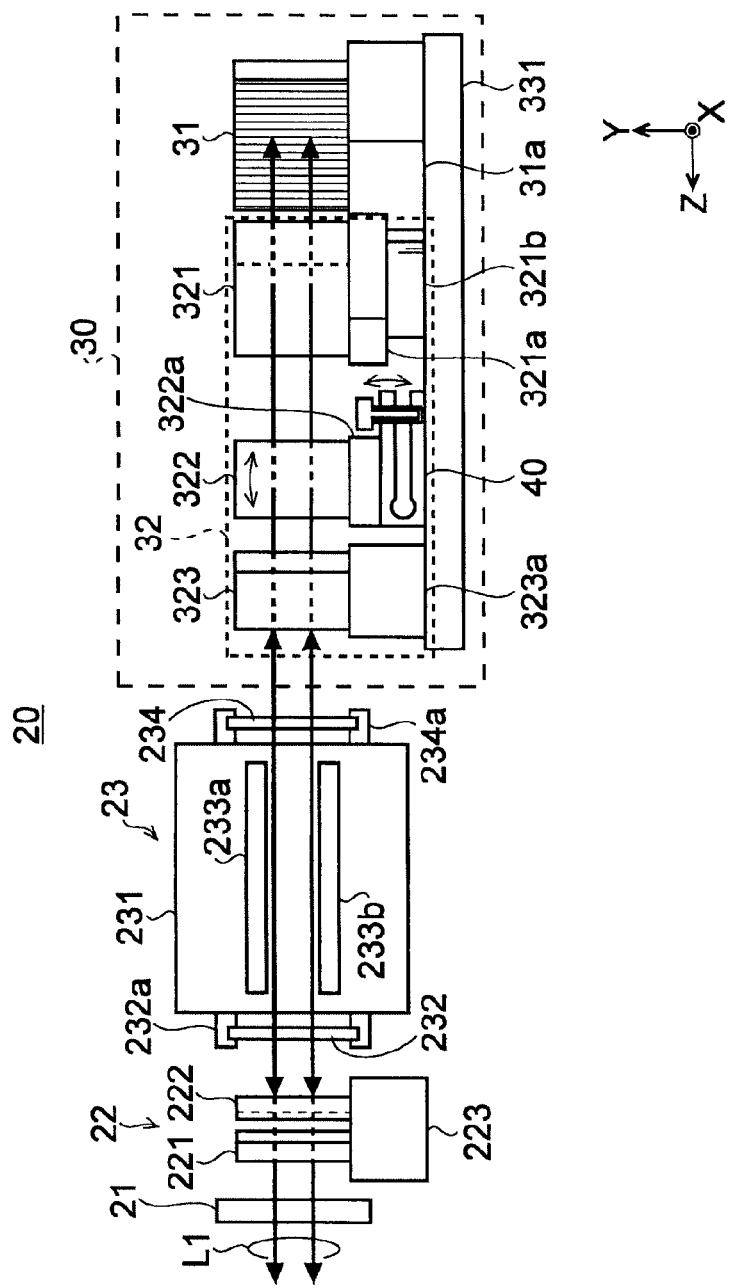
FIG. 2 is a side view schematically illustrating the configuration of a master oscillator system according to an embodiment.
Figure 3:
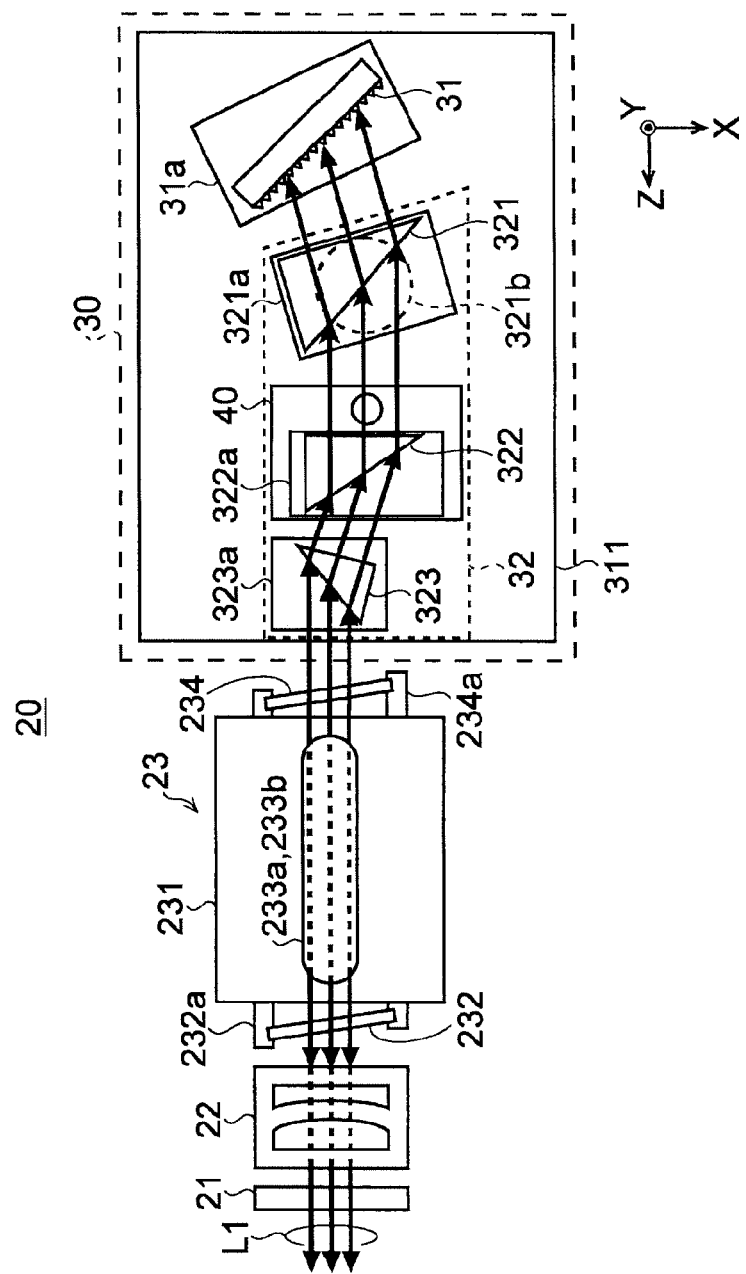
FIG. 3 is a top view schematically illustrating the configuration of a master oscillator system according to an embodiment.

Next, the master oscillator system 20 illustrated in FIG. 1 will be described in detail with reference to the drawings. FIG. 2 is a side view schematically illustrating the configuration of the master oscillator system 20. FIG. 3 is a top view schematically illustrating the configuration of the master oscillator system 20.

As shown in FIGS. 2 and 3, the master oscillator system 20 may include an output coupling mirror 21, the wavefront tuning unit 22, the amplifier 23, and a line narrow module 30. The line narrow module 30 may include the beam width tuning unit 32 and a grating 31.

The grating 31 and the output coupling mirror 21 may form an optical resonator. The grating 31 may function as a wavelength selection unit. The amplifier 23 may amplify the laser light L1 that travels back and forth within the optical resonator. The wavefront tuning unit 22 may tune the wavefront of the laser light L1 that travels back and forth within the optical resonator. The beam width tuning unit 32 may expand or reduce the beam cross-section of the laser light L1 that travels back and forth within the optical resonator. The amplifier 23, the wavefront tuning unit 22, and the beam width tuning unit 32 may operate under the control of the controller 10.

The wavefront tuning unit 22 may include a concave cylindrical lens 222 and a convex cylindrical lens 221. The curvature factor of the curved surface of the concave cylindrical lens 222 and the curvature factor of the curved surface of the convex cylindrical lens 221 may be the same. The concave cylindrical lens 222 and the convex cylindrical lens 221 may be disposed so that their curved surfaces face each other. The wavefront tuning unit 22 may include a movement mechanism (not shown) that moves the convex cylindrical lens 221 and/or the concave cylindrical lens 222 along the optical path of the laser light L1. The wavefront of the laser light L1 can be controlled by changing the distance between the convex cylindrical lens 221 and the concave cylindrical lens 222.

The amplifier 23 may include a laser chamber 231, windows 232 and 234, and a pair of discharge electrodes 233a and 233b. The interior of the laser chamber 231 may be filled with an excimer gas serving as a laser medium. A pumping voltage may be supplied between the discharge electrodes 233a and 233b under the control of the controller 10.

4.1 Line Narrow Module

Next, the line narrow module 30 will be described according to several examples.

4.1.1 Line Narrow Module in which Prism Attitude can be Adjusted

As shown in FIGS. 2 and 3, the line narrow module 30 may include a plurality of prisms 321, 322, and 323, and the grating 31. The plurality of prisms 321 through 323 and the grating 31 may be anchored to bases 321a through 323a and 31a, respectively. At least one of the bases 321a through 323a and 31a, for example, the base 322a of the prism 322, may be mounted on an attitude control mechanism 40 that enables the tilt of the prism 322 relative to the beam axis (optical axis) of the laser light L1 (called the "attitude" hereinafter) to be adjusted. At least one of the bases 321a through 323a and 31a, for example, the base 321a of the prism 321, may be held on a rotating table 321b that enables the prism 321 and the base 321a to rotate within a plane that is parallel to the plane of the paper for FIG. 3. The bases 31a and 323a, the attitude control mechanism 40, and the rotating table 321b may be anchored to a frame 311.

4.1.1.1 Mechanism for Adjusting Prism Attitude

Next, the attitude control mechanism 40 will be described according to several examples.

4.1.1.1.1 First Example

Figure 4:
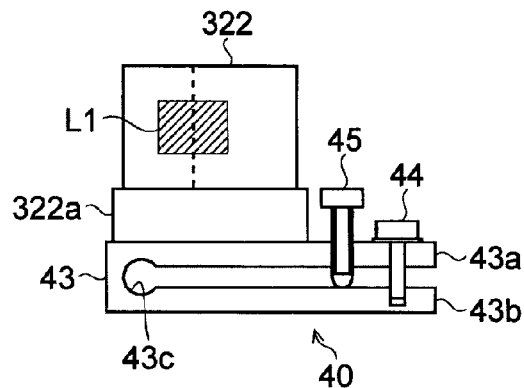
FIG. 4 is a side view illustrating an attitude control mechanism according to an embodiment.
Figure 5:
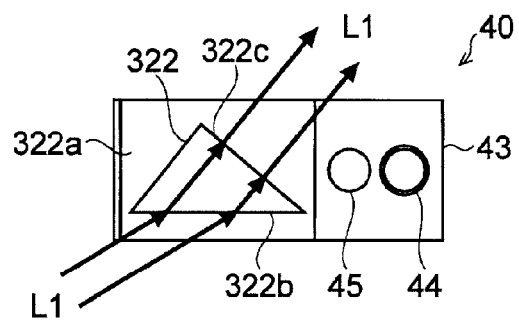
FIG. 5 is a top view illustrating the attitude control mechanism illustrated in FIG. 4.
Figure 6:
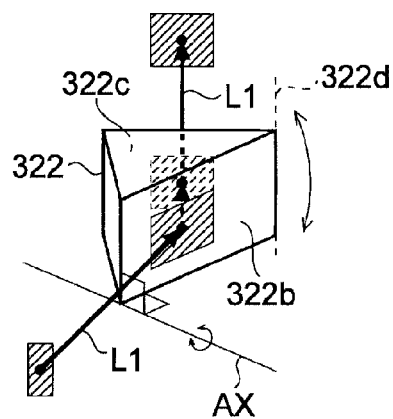
FIG. 6 illustrates a relationship between the rotational axis of a prism shown in FIG. 4 and laser light entry/exit surfaces.

FIGS. 4 and 5 schematically illustrate the configuration of the attitude control mechanism 40 according to a first example. FIG. 4 is a cross-sectional view of the attitude control mechanism 40, seen from the side. FIG. 5 is a top view of the attitude control mechanism 40. FIG. 6 illustrates a relationship between a rotational axis AX of the prism 322 and entry/exit surfaces of the laser light L1.

As shown in FIGS. 4 and 5, the attitude control mechanism 40 may include an attitude adjustment plate 43, configured of a flat plate bent into a U shape, and two bolts 44 and 45. The attitude adjustment plate 43 may include two plate portions 43a and 43b disposed approximately parallel to and at a distance from each other. The plate portions 43a and 43b may be connected at one end via a connection portion 43c. The connection portion 43c may be configured so that part thereof is thinner than other parts in order to reduce the rigidity of that part.

The base 322a on which the prism 322 is mounted may be anchored to the plate portion 43a. A hole and a threaded screw hole may be formed in the plate portion 43a. The bolt 44 may be passed through the hole. The leading end of the bolt 44 may interlock with screw grooves formed in the plate portion 43b. The bolt 45 may be threaded into the screw hole. The leading end of the bolt 45 may make contact with the plate portion 43b. The tilt of the plate portion 43a relative to the plate portion 43b can be adjusted by adjusting the amount by which the two bolts 44 and 45 are screwed in. As a result, the attitude of the prism 322 mounted on the base 322a can be adjusted. The angle at which the laser light L1 within the optical resonator is incident on the grating 31 may be adjusted by performing the stated adjustment.

The attitude control mechanism 40 may adjust the attitude of the prism 322 so that an axis 322d, at which two surfaces of the prism 322 including surfaces 322b and 322c at which the laser light L1 enters and exits, is tilted. The surface of a prism into/from which laser light enters/exits may also be called simply an "entry/exit surface." In the present example, the axis at which the two entry/exit surfaces 322b and 322c intersect is taken as the axis 322d, in order to clarify the descriptions. For example, the attitude control mechanism 40 may enable the prism 322 to rotate central to an axis AX that is perpendicular to a surface including one of the laser light L1 entry/exit surfaces 322b and 322c in the prism 322 (here, the entry/exit surface 322b on the amplifier 23 side). FIG. 6 shows the axis AX as perpendicular to the entry/exit surface 322b of the prism 322 and passing through one apex of the prism 322, in order to simplify the descriptions. According to this configuration, the tilt of the entry/exit surface 322b relative to the optical axis of the laser light L1 does not change due to the prism 322 rotating. Therefore, the adjustment of the attitude of the prism 322 relative to the optical axis is simplified.

4.1.1.1.2 Second Example

Figure 7:
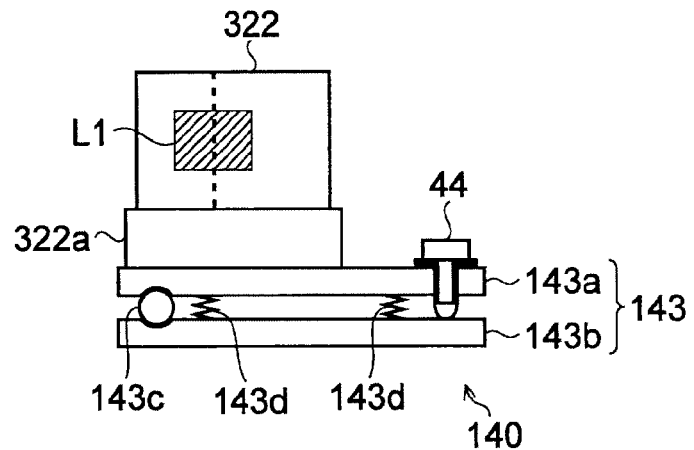
FIG. 7 is a side view illustrating another attitude control mechanism according to an embodiment.
Figure 8:
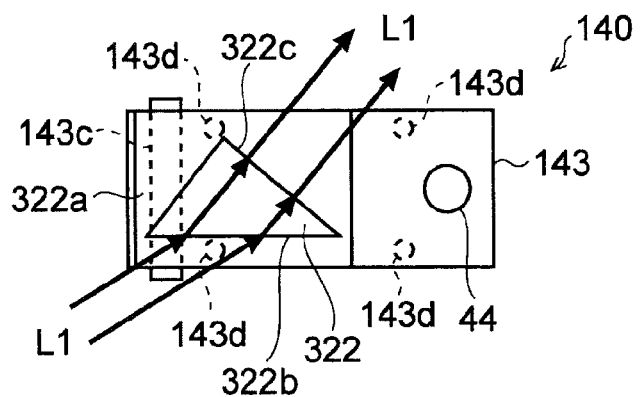
FIG. 8 is a top view illustrating the attitude control mechanism illustrated in FIG. 7.

FIGS. 7 and 8 schematically illustrate the configuration of an attitude control mechanism 140 according to a second example. FIG. 7 is a side view of the attitude control mechanism 140. FIG. 8 is a top view of the attitude control mechanism 140.

As shown in FIGS. 7 and 8, the attitude control mechanism 140 may include two plates 143a and 143b disposed approximately parallel to and at a distance from each other, one or more springs 143d, a shaft member 143c, and the bolt 44. The one or more springs 143d may hold the plate 143b and the plate 143a so as to pull toward each other elastically. The shaft member 143c may function as a rotational shaft for the plate 143a relative to the plate 143b. The bolt 44 may interlock with a screw hole formed in the plate 143a. The leading end of the bolt 44 may make contact with the plate 143b. The tilt of the plate 143a relative to the plate 143b can be adjusted by adjusting the amount by which the bolt 44 is screwed in. As a result, the attitude of the prism 322 mounted on the base 322a can be adjusted.

The shaft member 143c may be disposed in a direction that is perpendicular to a surface including, for example, one of the entry/exit surfaces 322b and 322c in the prism 322 shown in FIG. 8 (here, the entry/exit surface 322b on the amplifier 23 side). Through this, the tilt of the entry/exit surface 322b relative to the optical axis of the laser light L1 does not change due to the prism 322 rotating, in the same manner as described using FIG. 6. Therefore, the adjustment of the attitude of the prism 322 relative to the optical axis may be simplified.

4.1.2 Narrow-Band Laser Apparatus Including Mechanism for Changing Magnification Rate by Replacing Prisms Meanwhile, the beam width tuning unit 32 may include a plurality of optical systems having different magnification rates, and may be capable of replacing those optical systems. Note that in the following configurations, elements that are the same as those described earlier will be given the same reference numerals, and redundant descriptions thereof will be omitted.

4.1.2.1 First Example

Figure 9:
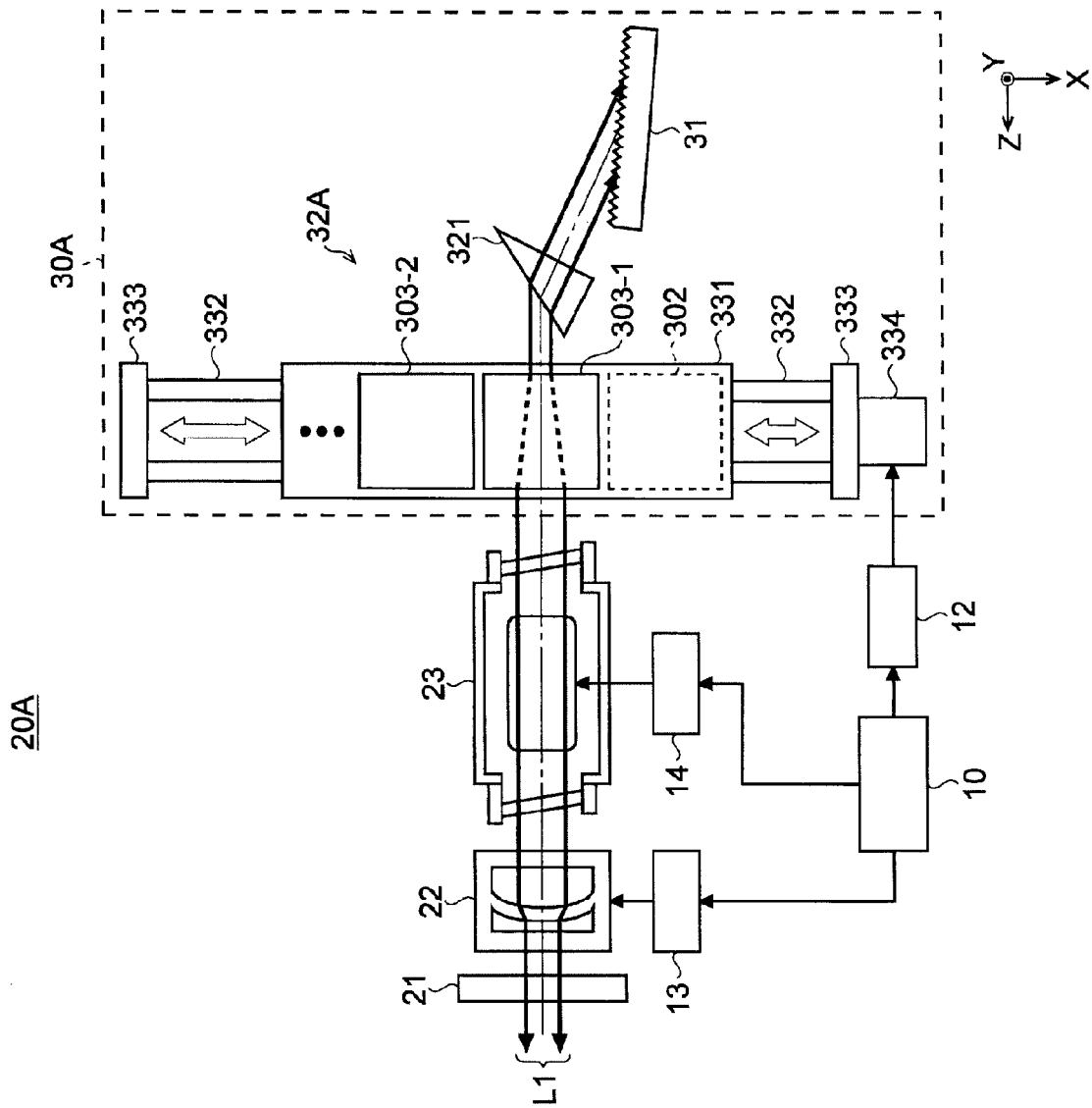
FIG. 9 schematically illustrates the configuration of a first example of a master oscillator system including a mechanism that changes a magnification rate by replacing prisms, according to an embodiment.

FIG. 9 schematically illustrates the configuration of a master oscillator system 20A according to a first example that includes a mechanism that changes a magnification rate by replacing prisms. As shown in FIG. 9, the master oscillator system 20A may include the output coupling mirror 21, the wavefront tuning unit 22, the amplifier 23, and a line narrow module 30A. The line narrow module 30A may include a beam width tuning unit 32A instead of the beam width tuning unit 32 of the line narrow module 30.

The beam width tuning unit 32A may include an optical path tuning prism 321, a moving stage 331, a slide rail 332, stoppers 333, a movement mechanism. 334, and beam width tuners 303-1 and 303-2. The number of beam width tuners is not limited to two, and more may be provided. Meanwhile, each of the beam width tuners 303-1 and 303-2 may include an attitude control mechanism like the attitude control mechanism 40 or 140. The beam width tuners 303-1 and 303-2 may have different magnification rates. In addition, the beam width tuning unit 32A may include a space 302 in which a beam width tuner is not disposed. The movement mechanism 334 may move the moving stage 331 along the slide rail 332 that is disposed perpendicular to the optical path of the laser light L1. Through this, one of the beam width tuners 303-1 and 303-2 and the space 302 may be selectively disposed within the optical path of the laser light L1. The movement of the moving stage 331 may be restricted by the stoppers 333 provided on both ends of the slide rail 332.

The optical axis of the laser light L1 emitted from the beam width tuners 303-1 and 303-2 or the space 302 may match an extension of the optical axis of the laser light L1 that has entered one of the beam width tuners 303-1 and 303-2 and the space 302. In other words, the beam width tuners 303-1 and 303-2 may change only the beam width of the laser light L1, while imparting almost no change on the optical axis of the laser light L1. The optical path tuning prism 321 may determine the optical path of the laser light L1 that travels back and forth within the optical resonator and the angle at which the laser light L1 is incident on the grating 31. The optical path tuning prism 321 may be anchored upon the base 321a (not shown). The beam width tuning unit 32A and the grating 31 may be anchored upon the frame 311 (not shown).

In addition, the master oscillator system 20A may include drivers 12 and 13 and a power source 14. The driver 12 may, under the control of the controller 10, drive the movement mechanism 334. The driver 13 may, under the control of the controller 10, drive the wavefront tuning unit 22. The power source 14 may supply a pumping voltage between the discharge electrodes 233a and 233b of the amplifier 23 under the control of the controller 10.

By moving the moving stage 331 using the movement mechanism 334, the beam width tuning unit 32A may selectively dispose one of the beam width tuners 303-1 and 303-2 and the space 302 in the optical path of the laser light L1. As a result, the beam width of the laser light L1 that is incident on the grating 31 can be changed at the magnification rates set in the beam width tuners 303-1 and 303-2, respectively. Note that the magnification rate of the space 302 is 1.

An alignment when the different beam width tuners 303-1 and 303-2 are set in the optical path of the laser light L1 may be adjusted in advance using the attitude control mechanism 40, 140, or the like. Through this, even if one of the beam width tuners is switched to by moving the moving stage 331, the alignment is already adjusted, and thus the master oscillator system 20A can carry out laser oscillation quickly at a desired performance.

4.1.2.1.1 Beam Width Tuning Unit

Here, examples of the beam width tuning unit will be described in detail using the drawings.

4.1.2.1.1.1 First Example

Figure 10:
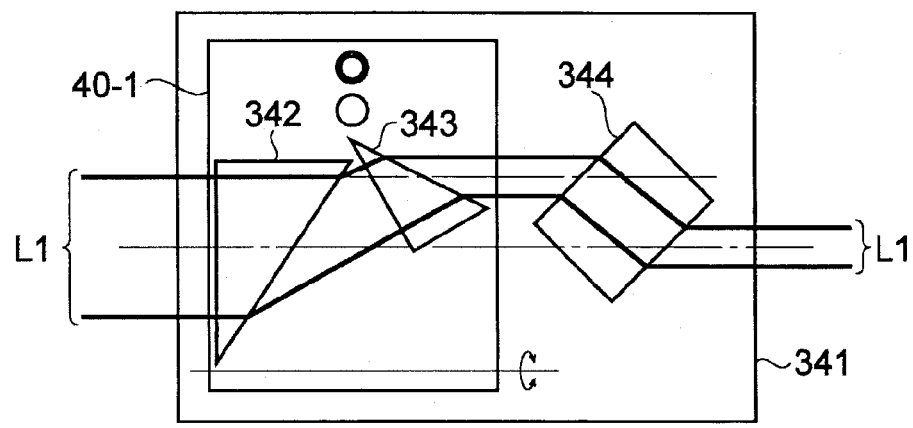
FIG. 10 schematically illustrates the configuration of a beam width tuner according to the first example of the master oscillator system illustrated in FIG. 9.

First, an example of a reduction system beam width tuner configured using a right-angled prism will be described. FIG. 10 schematically illustrates the configuration of a beam width tuner 303-1 according to the first example. Note that reduction system beam width tuners having different magnification rates configured using right-angled prisms may be configured in the same manner as described below.

As shown in FIG. 10, the reduction system beam width tuner 303-1 may include a frame 341, two prisms 342 and 343, a cube prism 344, and an attitude control mechanism 40-1. At least one of the prisms 342 and 343 may be anchored upon the attitude control mechanism 40-1. The attitude control mechanism 40-1 and the cube prism 344 may be anchored to the frame 341. The frame 341 may be mounted on the moving stage 331 shown in FIG. 9.

The prisms 342 and 343 may be right-angled prisms. The optical axis of the laser light L1 that passes through the prism 342 from the laser output end side may be changed to an optical axis that is parallel to the original optical axis by the laser light L1 passing through the prism 343. At this time, the beam width of the laser light L1 may be reduced. The cube prism 344 may return, back to an extension of the original optical axis, the laser light L1 that has shifted from the original optical axis. This enables the beam width of the laser light L1 that passes through the beam width tuner 303-1 from the laser output end side toward the grating 31 to be reduced without changing the optical axis of the laser light L1.

The attitude control mechanism 40-1 may rotate the prism 342 and/or 343 central to an axis that is perpendicular to, for example, a surface including an entry/exit surface on the laser output end side. Through this, the optical axis of the laser light L1 that is incident on the grating 31 can be tuned. In addition, by setting the rotational axis of the prism 342 and/or 343 to an axis perpendicular to a surface including an entry/exit surface on the laser output end side, the optical axis can easily be adjusted to a desired optical axis.

4.1.2.1.1.2 Second Example

Figure 11:
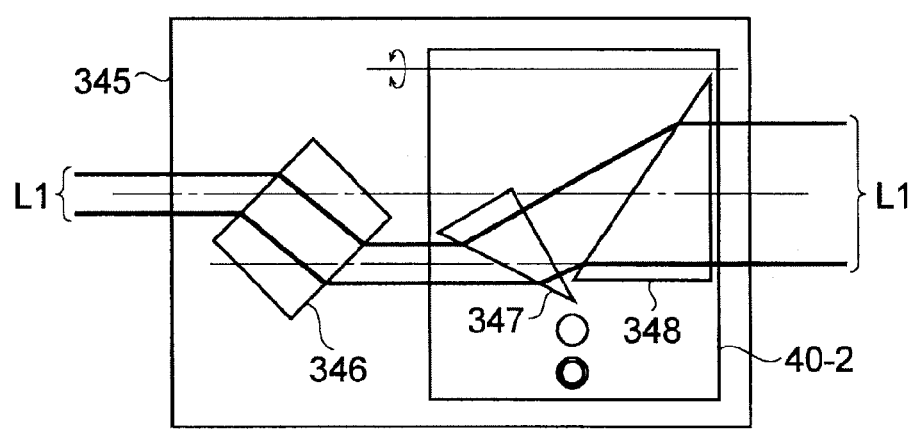
FIG. 11 schematically illustrates the configuration of a beam width tuner according to a second example of the master oscillator system illustrated in FIG. 9.

Next, an example of an expanding system beam width tuner configured using a prism will be described in detail using the drawings. FIG. 11 schematically illustrates the configuration of a beam width tuner 303-2 according to the second example. Note that expanding system beam width tuners having different magnification rates configured using right-angled prisms may be configured in the same manner as described below.

As shown in FIG. 11, the expanding system beam width tuner 303-2 may include a frame 345, a cube prism 346, two prisms 347 and 348, and an attitude control mechanism 40-2. At least one of the prisms 347 and 348 may be anchored upon the attitude control mechanism 40-2. The attitude control mechanism 40-2 and the cube prism 346 may be anchored to the frame 345. The frame 345 may be mounted on the moving stage 331 shown in FIG. 9.

The prisms 347 and 348 may be right-angled prisms. The optical axis of the laser light L1 that passes through the cube prism 346 from the laser output end side may be changed to an optical axis that is parallel to the original optical axis. The prisms 347 and 348 may return, back to an extension of the original optical axis, the laser light L1 that has shifted from the original optical axis. At this time, the beam width of the laser light L1 may be expanded. This enables the beam width of the laser light L1 that passes through the beam width tuner 303-2 from the laser output end side toward the grating 31 to be expanded without changing the optical axis of the laser light L1.

The attitude control mechanism 40-2 may rotate the prism 347 and/or 348 central to an axis that is perpendicular to, for example, a surface including an entry/exit surface on the grating 31 side. Through this, the optical axis of the laser light L1 that is incident on the grating 31 can be tuned. In addition, by setting the rotational axis of the prism 347 and/or 348 to an axis perpendicular to a surface including a entry/exit surface on the grating 31 side, the optical axis can easily be adjusted to a desired optical axis.

4.1.2.2 Second Example

Figure 12:
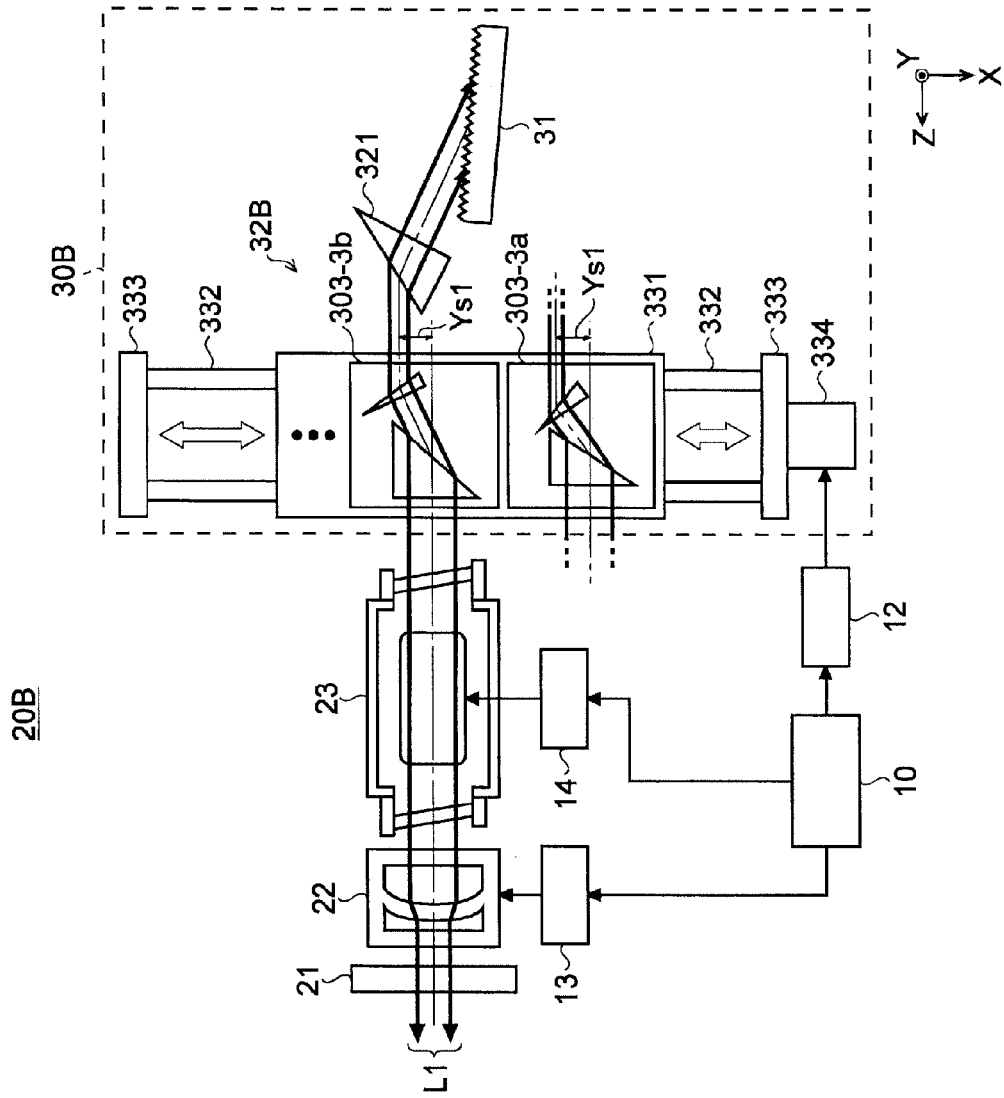
FIG. 12 schematically illustrates the configuration of the second example of the master oscillator system including a mechanism that changes a magnification rate by replacing prisms, according to an embodiment.

FIG. 12 schematically illustrates the configuration of a master oscillator system 20B according to a second example that includes a mechanism that changes a magnification rate by replacing prisms. As shown in FIG. 12, the master oscillator system 20B may have the same configuration as the master oscillator system 20A shown in FIG. 9, but with a line narrow module 30B replacing the line narrow module 30A. The line narrow module 30B, meanwhile, may have the same configuration as the line narrow module 30A, but with a beam width tuning unit 32B replacing the beam width tuning unit 32A.

The beam width tuning unit 32B may have the same configuration as the beam width tuning unit 32A, but with beam width tuners 303-3a and 303-3b replacing the beam width tuners 303-1 and 303-2. The number of beam width tuners is not limited to two, and more may be provided. Meanwhile, each of the beam width tuners 303-3a and 303-3b may include an attitude control mechanism like the attitude control mechanism 40 or 140. The beam width tuners 303-3a and 303-3b may have different magnification rates.

The beam width tuners 303-3a and 303-3b may shift the optical axis of the laser light L1 emitted to the grating 31 side parallel to the optical axis of the laser light L1 entering from the laser output end side by, for example, a distance Ys1. It is preferable for the optical axis shift direction and shift amount (the distance Ys1) to be the same for the beam width tuners 303-3a and 303-3b. In addition, it is preferable for the optical path tuning prism 321 and the grating 31 to be positioned in accordance with the optical axis shift. According to this configuration, the shift amount of the optical axis of the laser light L1 is the same even when the beam width tuners 303-3a and 303-3b are switched, and thus the master oscillator system 20B can carry out laser oscillation quickly at a desired performance.

By moving the moving stage 331 using the movement mechanism 334, the beam width tuning unit 32B may selectively dispose one of the beam width tuners 303-3a and 303-3b in the optical path of the laser light L1. As a result, the beam width of the laser light L1 that is incident on the grating 31 can be changed at the magnification rates set in the beam width tuners 303-3a and 303-3b, respectively.

An alignment when the different beam width tuners 303-3a and 303-3b are set in the optical path of the laser light L1 may be adjusted in advance using attitude control mechanisms 40-3, 40-4, or the like, which will be described later. Through this, even if one of the beam width tuners is switched to by moving the moving stage 331, the alignment is already adjusted, and thus the master oscillator system 20B can carry out laser oscillation quickly at a desired performance.

4.1.2.2.1 Beam Width Tuning Unit

Here, examples of the beam width tuning unit will be described in detail using the drawings.

4.1.2.2.1.1 First Example

Figure 13:
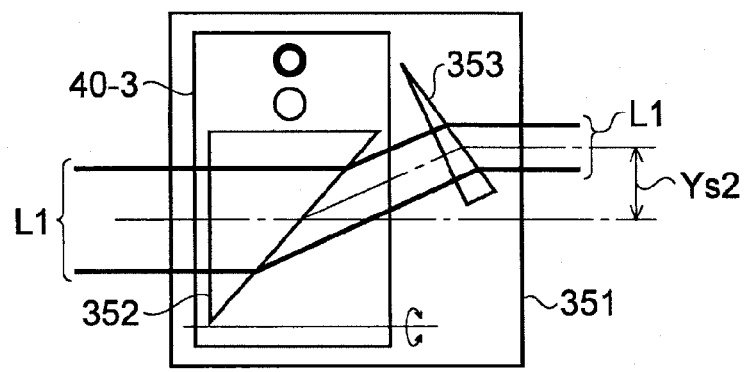
FIG. 13 schematically illustrates the configuration of a beam width tuner according to the first example of the master oscillator system illustrated in FIG. 12.

First, an example of a reduction system beam width tuner configured using a right-angled prism will be described. FIG. 13 schematically illustrates the configuration of a beam width tuner 303-3 according to a first example. Note that reduction system beam width tuners having different magnification rates configured using right-angled prisms may be configured in the same manner as described below.

As shown in FIG. 13, the reduction system beam width tuner 303-3 may include a frame 351, two prisms 352 and 353, and the attitude control mechanism 40-3. The prism 352 may be anchored upon the attitude control mechanism 40-3. The attitude control mechanism 40-3 and the prism 353 may be anchored to the frame 351. The frame 351 may be mounted on the moving stage 331 shown in FIG. 12.

The prisms 352 and 353 may be right-angled prisms. The optical axis of the laser light L1 that passes through the prism 352 from the laser output end side may be changed to an optical axis that is parallel to the original optical axis by the laser light L1 passing through the prism 353. At this time, the beam width of the laser light L1 may be reduced. This enables the beam width of the laser light L1 that passes through the beam width tuner 303-3 from the laser output end side toward the grating 31 to be reduced. In addition, the optical axis of the laser light L1 that passes through the prisms 352 and 353 may be shifted parallel to the original optical axis by a predetermined distance (an optical axis shift amount Ys2).

The attitude control mechanism 40-3 may rotate the prism 352 central to an axis that is perpendicular to, for example, a surface including an entry/exit surface on the laser output end side. Through this, the optical axis of the laser light L1 that is incident on the grating 31 can be tuned. In addition, by setting the rotational axis of the prism 352 to an axis perpendicular to a surface including an entry/exit surface on the laser output end side, the optical axis can easily be adjusted to a desired optical axis.

4.1.2.2.1.2 Second Example

Figure 14:
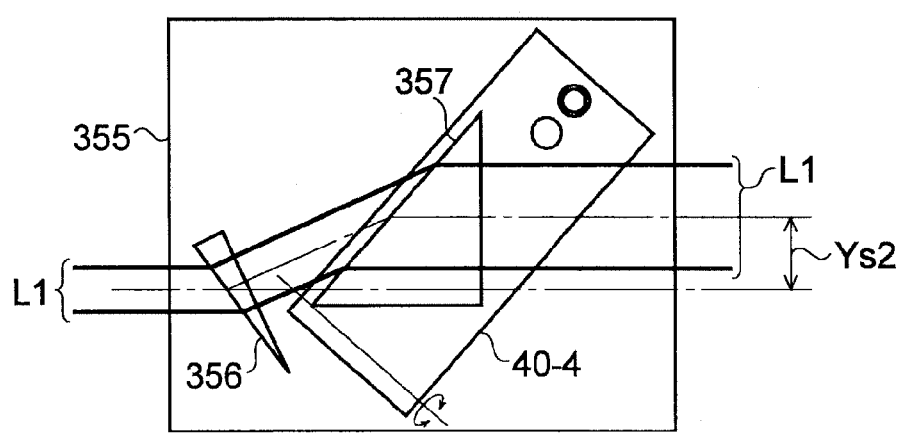
FIG. 14 schematically illustrates the configuration of a beam width tuner according to the second example of the master oscillator system illustrated in FIG. 12.

Next, an example of an expanding system beam width tuner configured using a right-angled prism will be described. FIG. 14 schematically illustrates the configuration of a beam width tuner 303-4 according to a second example. Note that expanding system beam width tuners having different magnification rates configured using right-angled prisms may be configured in the same manner as described below.

As shown in FIG. 14, the expanding system beam width tuner 303-4 may include a frame 355, two prisms 356 and 357, and the attitude control mechanism 40-4. The prism 357 may be anchored upon the attitude control mechanism 40-4. The attitude control mechanism 40-4 and the prism 356 may be anchored to the frame 355. The frame 355 may be mounted on the moving stage 331 shown in FIG. 12.

The prisms 356 and 357 may be right-angled prisms. The optical axis of the laser light L1 that passes through the prism 356 from the laser output end side may be changed to an optical axis that is parallel to the original optical axis by the laser light L1 passing through the prism 357. At this time, the beam width of the laser light L1 may be expanded. This enables the beam width of the laser light L1 that passes through the beam width tuner 303-4 from the laser output end side toward the grating 31 to be expanded. In addition, the optical axis of the laser light L1 that passes through the prisms 356 and 357 may be shifted parallel to the original optical axis by a predetermined distance (an optical axis shift amount Ys2).

The attitude control mechanism 40-4 may rotate the prism 357 central to an axis that is perpendicular to, for example, a surface including an entry/exit surface on the grating 31 side. Through this, the optical axis of the laser light L1 that is incident on the grating 31 can be tuned. In addition, by setting the rotational axis of the prism 357 to an axis perpendicular to a surface including an entry/exit surface on the grating 31 side, the optical axis can easily be adjusted to a desired optical axis.

4.1.2.3 Third Example

Figure 15:
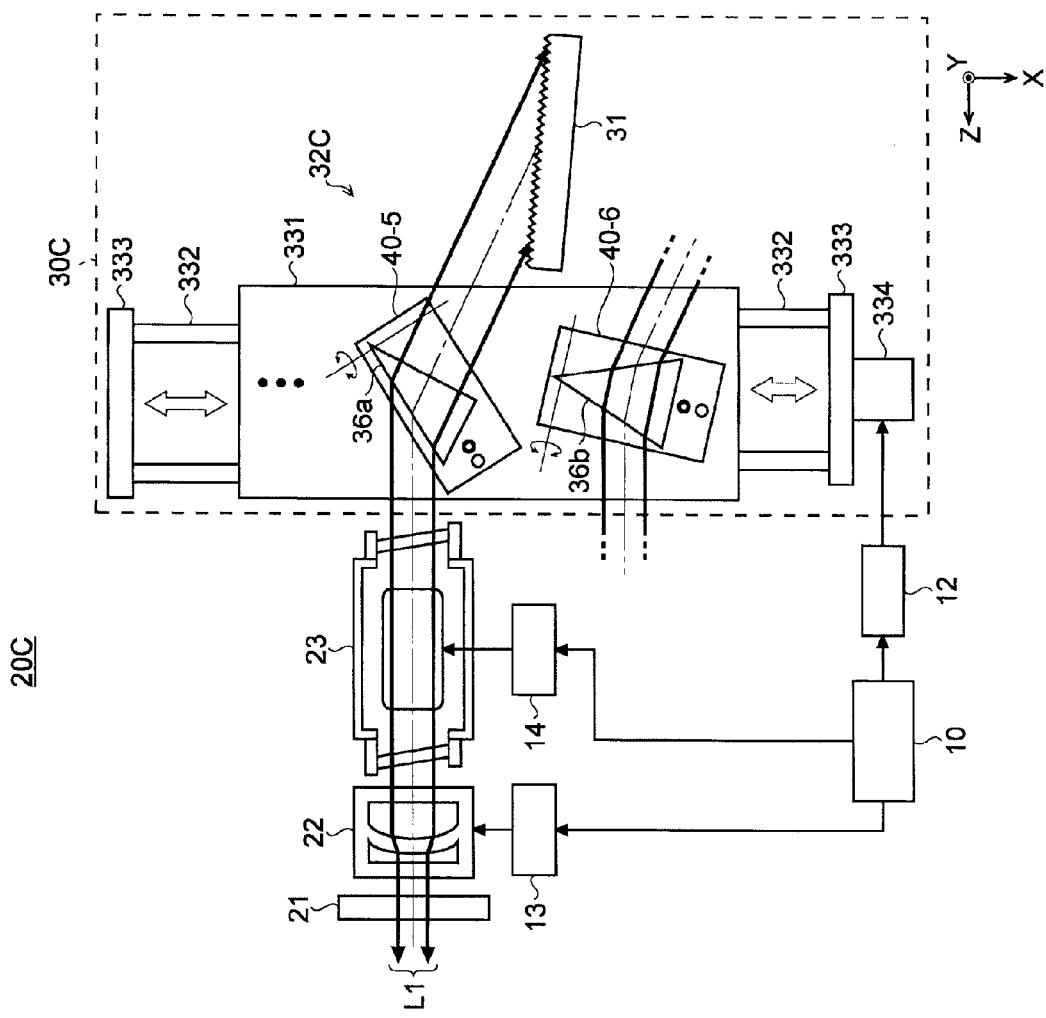
FIG. 15 schematically illustrates the configuration of a third example of the master oscillator system including a mechanism that changes a magnification rate by replacing prisms, according to an embodiment.

Next, a third example of the master oscillator system 20 illustrated in FIG. 1 will be described in detail with reference to the drawings. In the third example, the optical path tuning prism 321 that tunes the optical path through which the laser light L1 is incident on the grating 31 may be used in the beam width tuning unit. FIG. 15 schematically illustrates the configuration of a master oscillator system 20C according to the third example. As shown in FIG. 15, the master oscillator system 20C may have the same configuration as the master oscillator system 20A shown in FIG. 9, but with a line narrow module 30C replacing the line narrow module 30A. The line narrow module 30C may omit the optical path tuning prism 321 immediately before the grating 31 and may replace the beam width tuning unit 32A with a beam width tuning unit 32C.

As shown in FIG. 15, the beam width tuning unit 32C may include a plurality of optical path tuning prisms 36a and 36b. The number of optical path tuning prisms is not limited to two, and more may be provided. The optical path tuning prisms 36a and 36b may be provided in attitude control mechanisms 40-5 and 40-6, respectively. The attitude control mechanisms 40-5 and 40-6 may be anchored upon the moving stage 331.

The optical axis of the laser light L1 emitted from the optical path tuning prism 36a toward the grating 31 in the case where the optical path tuning prism 36a is disposed within the optical path of the laser light L1 and the optical axis of the laser light L1 emitted from the optical path tuning prism 36b in the case where the optical path tuning prism 36b is disposed within the optical path of the laser light L1 may be essentially the same. However, it is preferable for the beam width of the laser light L1 emitted from the optical path tuning prism 36a toward the grating 31 in the case where the optical path tuning prism 36a is disposed within the optical path of the laser light L1 to be different from the beam width of the laser light L1 emitted from the optical path tuning prism 36b in the case where the optical path tuning prism 36b is disposed within the optical path of the laser light L1. By moving the moving stage 331 using the movement mechanism 334, the beam width tuning unit 32C may selectively dispose one of the optical path tuning prisms 36a and 36b in the optical path of the laser light L1.

The optical path tuning prism 36a may, for example, be a right-angled prism. The attitude control mechanism 40-5 in which the optical path tuning prism 36a is provided may rotate the optical path tuning prism 36a central to an axis that is perpendicular to, for example, a surface including an entry/exit surface on the laser output end side. Through this process, the optical axis of the laser light L1 that is incident on the grating 31 can be tuned. In addition, by setting the rotational axis of the optical path tuning prism 36a to an axis perpendicular to a surface including an entry/exit surface on the laser output end side, the optical axis can easily be adjusted to a desired optical axis.

The optical path tuning prism 36b may, for example, be a dispersing prism. The attitude control mechanism 40-6 in which the optical path tuning prism 36b is provided may rotate the optical path tuning prism 36b central to, for example, an axis parallel to the optical path of the laser light L1 that travels within the optical path tuning prism 36b. Through this, the optical axis of the laser light L1 that is incident on the grating 31 can be tuned. In addition, by setting the rotational axis of the optical path tuning prism 36b to an axis parallel to the optical path of the laser light 11 that travels within the optical path tuning prism 36b, the optical axis can easily be adjusted to a desired optical axis.

By moving the moving stage 331 using the movement mechanism 334, the beam width tuning unit 32C may selectively dispose one of the optical path tuning prisms 36a and 36b in the optical path of the laser light L1. As a result, the beam width of the laser light L1 that is incident on the grating 31 can be changed at the magnification rates set in the optical path tuning prisms 36a and 36b, respectively.

An alignment when the different optical path tuning prisms 36a and 36b are set in the optical path of the laser light L1 may be adjusted in advance using the attitude control mechanisms 40-5, 40-6, or the like. Through this, even if one of the optical path tuning prisms is switched to by moving the moving stage 331, the alignment is already adjusted, and thus the master oscillator system 200 can carry out laser oscillation quickly at a desired performance.

4.1.2.4 Fourth Example

In addition, a plurality of optical path tuning prisms may be used, and at least one of those optical path tuning prisms may be used as the beam width tuner. A fourth example, in which a plurality of optical path tuning prisms are used, will be described in detail hereinafter using the drawings.

4.1.2.4.1 when Single Prism can be Replaced

Figure 16:
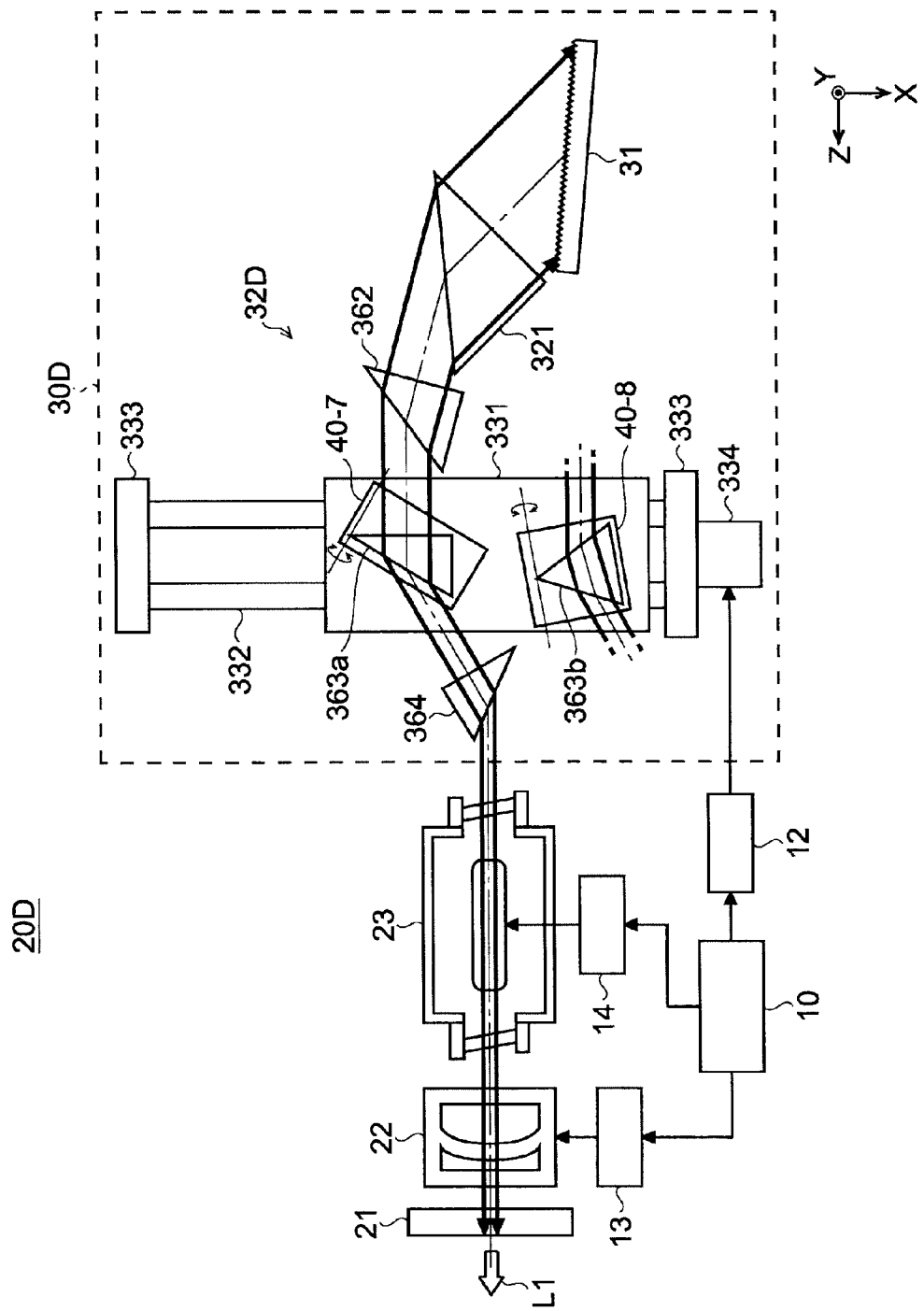
FIG. 16 illustrates an example of the configuration of a master oscillator system including a beam width tuning unit in which of a plurality of optical path tuning prisms, one prism is used as a beam width tuner, according to an embodiment.
Figure 17:
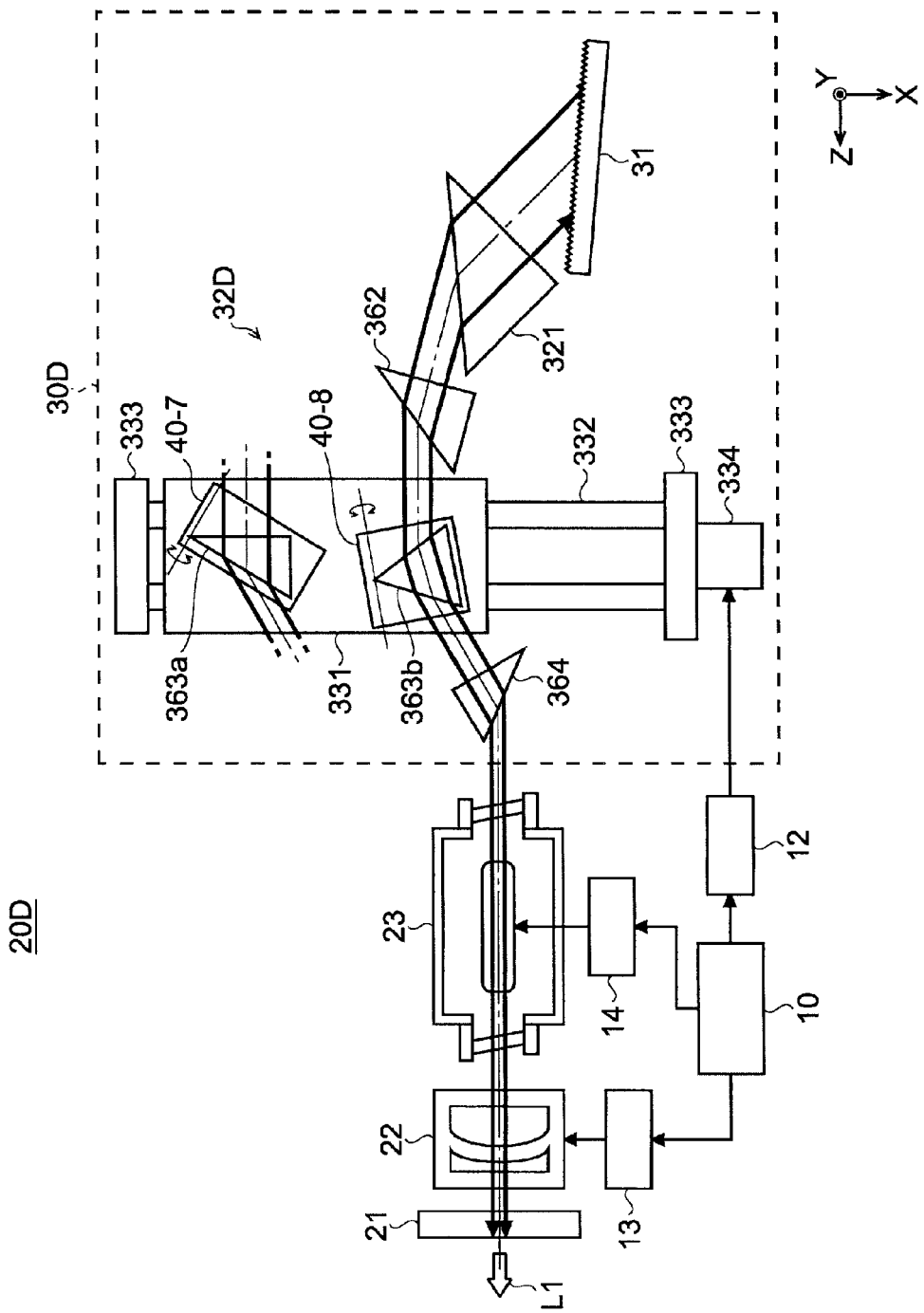
FIG. 17 illustrates another example of the disposition illustrated in FIG. 16.

First, a case in which one of a plurality of optical path tuning prisms is used as a beam width tuner will be described. FIGS. 16 and 17 schematically illustrate an example of the configuration of a master oscillator system 20D including a beam width tuning unit 32D in which one of the plurality of optical path tuning prisms is used as a beam width tuner.

As shown in FIGS. 16 and 17, the beam width tuning unit 32D of the line narrow module 30D may include a plurality of optical path tuning prisms 321, 362, 363a, 363b, and 364. Of these, it is preferable for the optical path tuning prism 363a to be capable of being swapped with the optical path tuning prism 363b in the optical path of the laser light L1. FIG. 16 illustrates a case where the optical path tuning prism 363a is disposed in the optical path, whereas FIG. 17 illustrates a case where the optical path tuning prism 363b is disposed in the optical path.

The optical axis of the laser light L1 emitted from the optical path tuning prism 363a toward the grating 31 in the case where the optical path tuning prism 363a is disposed within the optical path of the laser light L1 and the optical axis of the laser light L1 emitted from the optical path tuning prism 363b in the case where the optical path tuning prism 363b is disposed within the optical path of the laser light L1 may be essentially the same. However, it is preferable for the beam width of the laser light L1 emitted from the optical path tuning prism 363a toward the grating 31 in the case where the optical path tuning prism 363a is disposed within the optical path of the laser light L1 to be different from the beam width of the laser light L1 emitted from the optical path tuning prism 363b in the case where the optical path tuning prism 363b is disposed within the optical path of the laser light L1.

The optical path tuning prisms 363a and 363b may be anchored upon attitude control mechanisms 40-7 and 40-8, respectively. The attitude control mechanisms 40-7 and 40-8 may rotate the respective optical path tuning prisms 363a and 363b central to axes that are perpendicular to surfaces including an entry/exit surface on the laser output end side. Through this, the optical axes of the laser light L1 that is incident on the grating 31 can be tuned. In addition, by setting the rotational axes of the optical path tuning prisms 363a and 363b to axes perpendicular to a surface including an entry/exit surface on the laser output end side, the optical axes can easily be adjusted to desired optical axes.

The optical path tuning prisms 363a and 363b may be mounted on the moving stage 331. By moving the moving stage 331 using the movement mechanism 334, the beam width tuning unit 32D may selectively dispose one of the optical path tuning prisms 363a and 363b in the optical path of the laser light L1. As a result, the beam width of the laser light L1 that is incident on the grating 31 can be changed at the magnification rates set in the optical path tuning prisms 363a and 363b, respectively.

4.1.2.4.2 When Two or More Prisms can be Replaced (No. 1)

Figure 18:
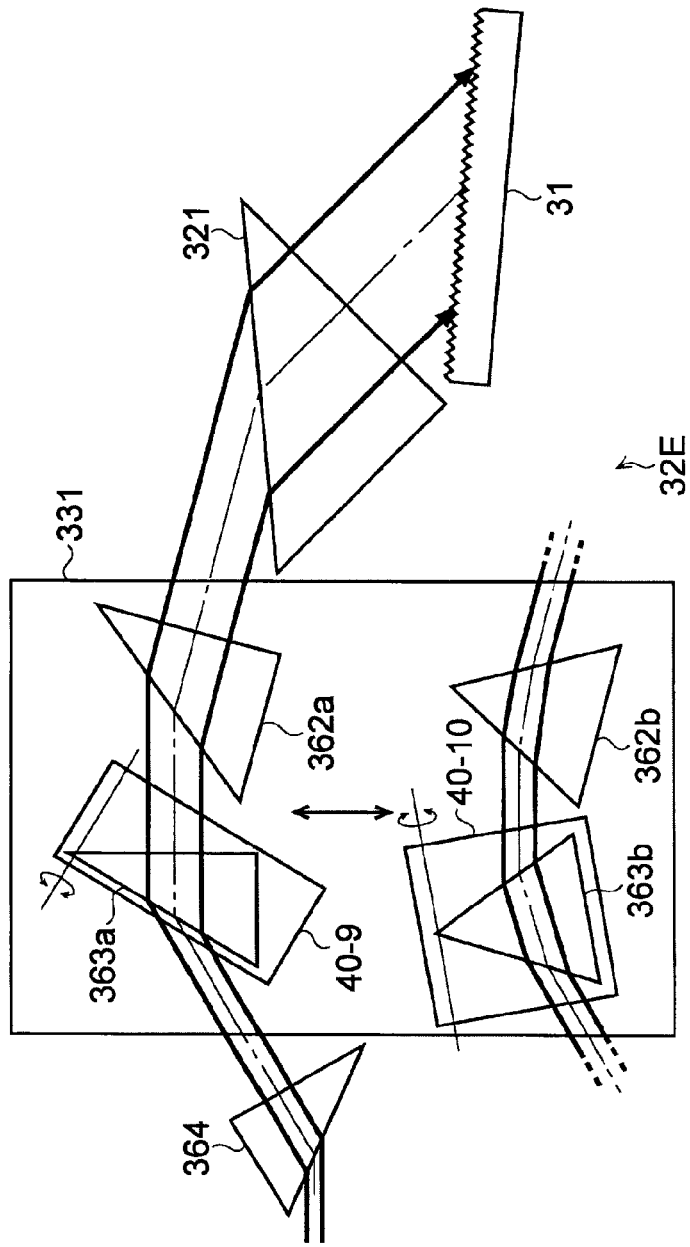
FIG. 18 illustrates an example of the configuration of a beam width tuning unit in which of four optical path tuning prisms, the two optical path tuning prisms located in the middle are used as a beam width tuner, according to an embodiment.

In addition, a plurality of optical path tuning prisms may be used, and a plurality of those optical path tuning prisms may be used as the beam width tuner. FIG. 18 illustrates an example of the configuration of a beam width tuning unit 32E in which the middle two optical path tuning prisms of four optical path tuning prisms are used as the beam width tuner.

As shown in FIG. 18, the beam width tuning unit 32E may include a plurality of optical path tuning prisms 321, 362a, 362b, 363a, 363b, and 364. Of these, it is preferable for the optical path tuning prisms 362a and 363a to be capable of being swapped with the optical path tuning prisms 362b and 363b in the optical path of the laser light L1. FIG. 18 illustrates a case where the optical path tuning prisms 362a and 363a are disposed in the optical path.

The optical axis of the laser light L1 emitted from the optical path tuning prism 362a toward the grating 31 in the case where the optical path tuning prisms 363a and 362a are disposed within the optical path of the laser light L1 and the optical axis of the laser light L1 emitted from the optical path tuning prism 362b in the case where the optical path tuning prisms 363b and 362b are disposed within the optical path of the laser light L1 may be essentially the same. However, it is preferable for the beam width of the laser light L1 emitted from the optical path tuning prism 362a toward the grating 31 in the case where the optical path tuning prisms 363a and 362a are disposed within the optical path of the laser light L1 to be different from the beam width of the laser light L1 emitted from the optical path tuning prism 362b in the case where the optical path tuning prisms 363b and 362b are disposed within the optical path of the laser light L1.

At least one of the optical path tuning prisms 362a and 363a may be anchored upon an attitude control mechanism 40-9. FIG. 18 illustrates a case where the optical path tuning prism 363a is anchored upon the attitude control mechanism 40-9. The attitude control mechanism 40-9 may rotate the optical path tuning prism 363a central to an axis that is perpendicular to a surface including an entry/exit surface on the laser output end side. Through this, the optical axis of the laser light L1 that is incident on the grating 31 can be tuned. In addition, by setting the rotational axis of the optical path tuning prism 363a to an axis perpendicular to a surface including an entry/exit surface on the laser output end side, the optical axis can easily be adjusted to a desired optical axis.

Likewise, at least one of the optical path tuning prisms 362b and 363b may be anchored upon an attitude control mechanism 40-10. The optical path tuning prisms 362b and 363b may, for example, be dispersing prisms. The attitude control mechanism 40-10 in which the optical path tuning prism 363b is provided may rotate the optical path tuning prism 363b central to, for example, an axis parallel to the optical path of the laser light L1 that travels within the optical path tuning prism 363b. Through this, the optical axis of the laser light that is incident on the grating 31 can be tuned. In addition, by setting the rotational axis of the optical path tuning prism 363b to an axis parallel to the optical path of the laser light that travels within the optical path tuning prism 363b, the optical axis can easily be adjusted to a desired optical axis.

The optical path tuning prisms 362a, 362b, 363a, and 363b may be mounted on the moving stage 331. By moving the moving stage 331 using the movement mechanism 334, which is not shown in FIG. 18, the beam width tuning unit 321 may selectively dispose the optical path tuning prisms 362a and 363a or the optical path tuning prisms 362b and 363b in the optical path of the laser light L1. As a result, the beam width of the laser light L1 that is incident on the grating 31 can be changed at the magnification rates set in the respective combinations of the optical path tuning prisms.

4.1.2.4.3 when Two or More Prisms can be Replaced (No. 2)

Figure 19:
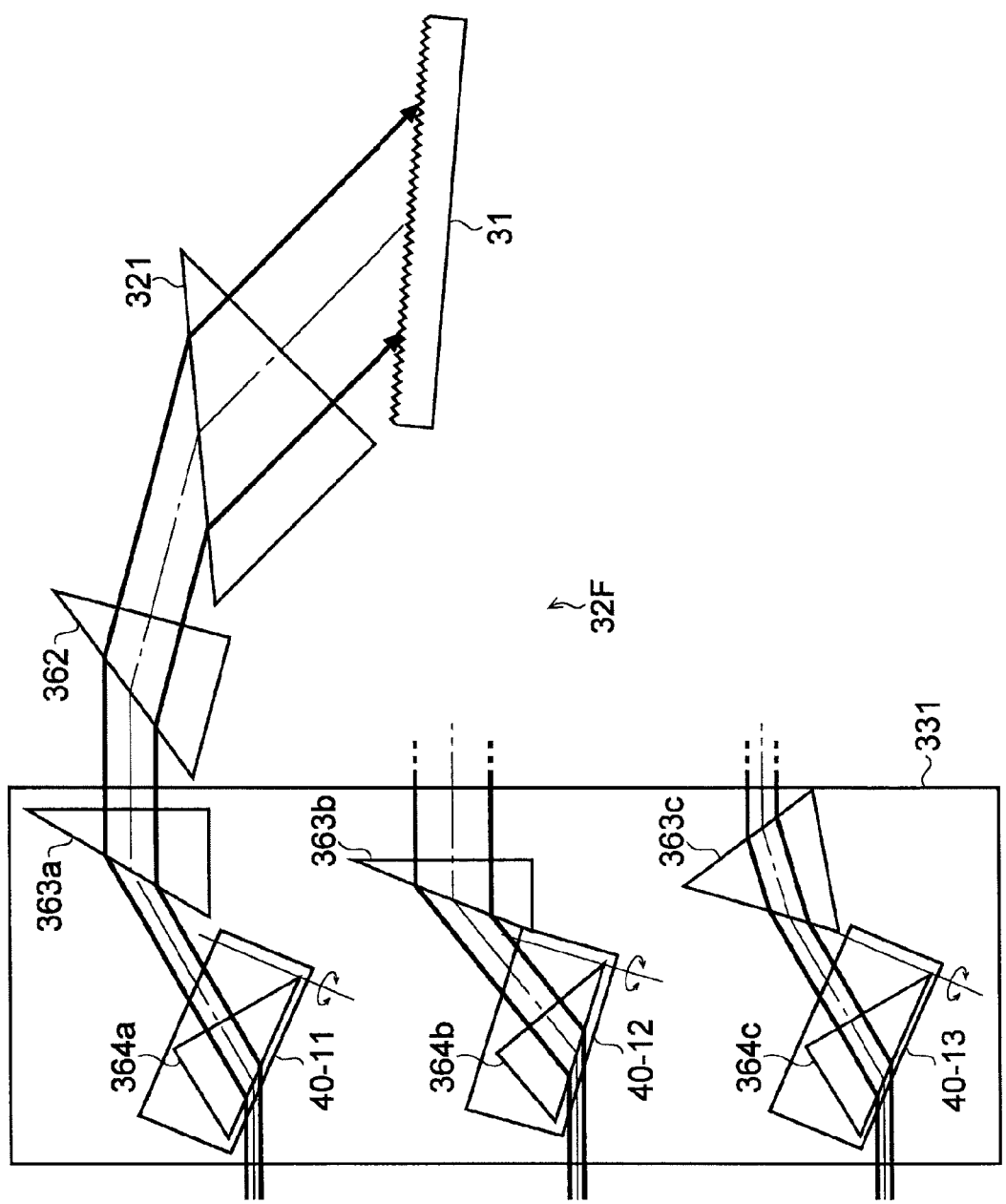
FIG. 19 illustrates an example of the configuration of a beam width tuning unit in which of four optical path tuning prisms, the two optical path tuning prisms located toward a laser output end are used as a beam width tuner, according to an embodiment.

In addition, of a plurality of optical path tuning prisms, a plurality of optical path tuning prisms including the optical path tuning prism located closest to the laser output end side may be used as the beam width tuner. FIG. 19 illustrates an example of the configuration of a beam width tuning unit 32F in which, of four optical path tuning prisms, the two optical path tuning prisms closest to the laser output end side are used as the beam width tuner.

As shown in FIG. 19, the beam width tuning unit 32F may include a plurality of optical path tuning prisms 321, 362, 363a through 363c, and 364a through 364c. Of these, it is preferable for the optical path tuning prisms 363a and 364a, the optical path tuning prisms 363b and 364b, and the optical path tuning prisms 363c and 364c to be capable of being swapped in the optical path of the laser light L1. FIG. 19 illustrates a case where the optical path tuning prisms 363a and 364a are disposed in the optical path.

The laser light L1 may be emitted from the optical path tuning prisms toward the grating 31 along essentially the same optical axis in the case where the optical path tuning prisms 363a and 364a are disposed in the optical path of the laser light L1, the case where the optical path tuning prisms 363b and 364b are disposed in the optical path of the laser light L1, and the case where the optical path tuning prisms 363c and 364c are disposed in the optical path of the laser light L1. However, it is preferable for the beam width of the laser light L1 emitted toward the grating 31 to be different in the case where the optical path tuning prisms 363a and 364a are disposed in the optical path of the laser light L1, the case where the optical path tuning prisms 363b and 364b are disposed in the optical path of the laser light L1, and the case where the optical path tuning prisms 363c and 364c are disposed in the optical path of the laser light L1, respectively.

At least one of the optical path tuning prisms 363a and 364a may be anchored upon an attitude control mechanism 40-11. FIG. 19 illustrates a case where the optical path tuning prism 364a is anchored upon the attitude control mechanism 40-11. The attitude control mechanism 40-11 may rotate the optical path tuning prism 364a central to an axis that is perpendicular to a surface including an entry/exit surface on the laser output end side. Through this, the optical axis of the laser light L1 that is incident on the grating 31 can be tuned. In addition, by setting the rotational axis of the optical path tuning prism 364a to an axis perpendicular to a surface including an entry/exit surface on the laser output end side, the optical axis can easily be adjusted to a desired optical axis.

Likewise, at least one of the optical path tuning prisms 363b and 364b may be anchored upon an attitude control mechanism 40-12, and at least one of the optical path tuning prisms 363c and 364c may be anchored upon an attitude control mechanism 40-13.

The optical path tuning prisms 363a through 363c and 364a through 364c may be mounted on the moving stage 331. By moving the moving stage 331 using the movement mechanism 334, which is not shown, the beam width tuning unit 32F may selectively dispose the optical path tuning prisms 363a and 364a, the optical path tuning prisms 363b and 364b, or the optical path tuning prisms 363c and 364c in the optical path of the laser light L1. As a result, the beam width of the laser light L1 that is incident on the grating 31 can be changed at the magnification rates set in the respective combinations of the optical path tuning prisms.

4.1.2.4.4 When Non-moving Prism is Disposed on Attitude Control Mechanism

Figure 20:
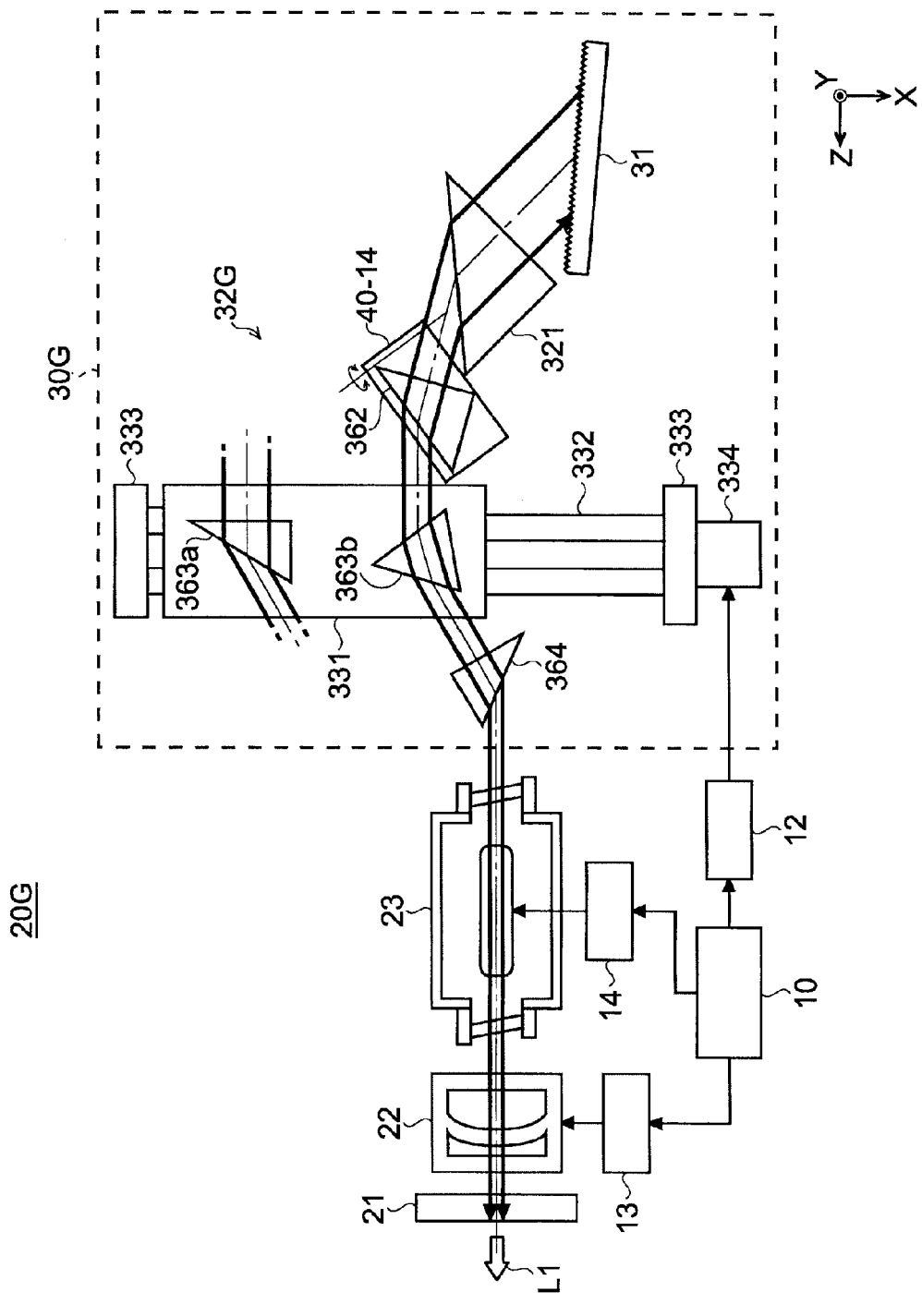
FIG. 20 illustrates an example of the configuration of a master oscillator system including a beam width tuning unit in which of a plurality of optical path tuning prisms, a prism that does not move is used as a beam width tuner, according to an embodiment.

A non-moving optical path tuning prism, such as an optical path tuning prism 362, may be disposed on the attitude control mechanism. FIG. 20 illustrates an example of the configuration of a master oscillator system 20G including a beam width tuning unit 32G in which the non-moving optical path tuning prism 362 is used as a beam width tuner.

As shown in FIG. 20, the beam width tuning unit 32G of a line narrow module 30G may have a configuration in which the optical path tuning prism 362 is disposed on an attitude control mechanism 40-14. The attitude control mechanism 40-14 may be anchored to the frame 311, which is not shown. The attitude control mechanism 40-14 may rotate the optical path tuning prism 362 central to an axis that is perpendicular to a surface including an entry/exit surface on the laser output end side. Through this, the optical axis of the laser light L1 that is incident on the grating 31 can be tuned. In addition, by setting the rotational axis of the optical path tuning prism 362 to an axis perpendicular to a surface including an entry/exit surface on the laser output end side, the optical axis can easily be adjusted to a desired optical axis.

4.2 Wavefront Tuning Unit

Figure 21:
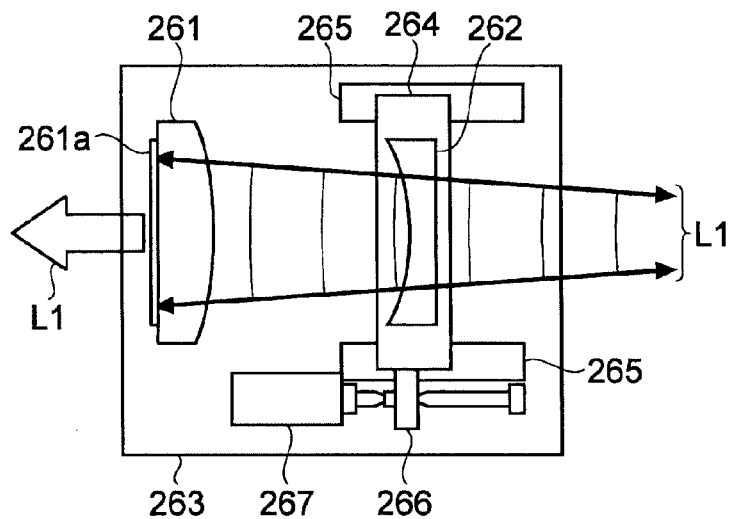
FIG. 21 is a top view of another wavefront tuning unit according to an embodiment.
Figure 22:
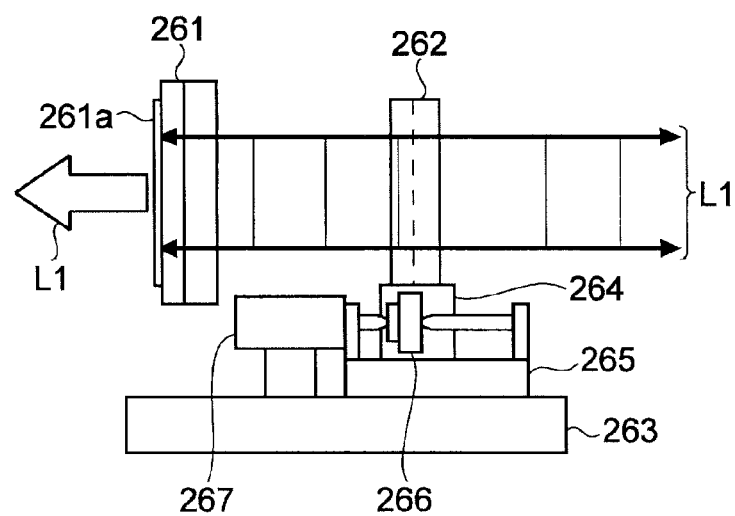
FIG. 22 is a side view illustrating the wavefront tuning unit illustrated in FIG. 21.

The wavefront tuning unit 22 and the output coupling mirror 21 may be replaced with a wavefront tuning unit 26 provided with the functions of both of those elements. FIGS. 21 and 22 illustrate an example of the configuration of the wavefront tuning unit 26. FIG. 21 is a top view of the wavefront tuning unit 26. FIG. 22 is a side view of the wavefront tuning unit 26.

The wavefront tuning unit 26 may include a convex cylindrical lens 261 whose one surface is configured as a curved surface that protrudes in a semicylindrical shape, a concave cylindrical lens 262 whose one surface is configured as a curved surface that is recessed in a semicylindrical shape, and a frame 263. The concave cylindrical lens 262 may be provided with a movement mechanism that moves that lens along the optical axis of the laser light L1. The convex cylindrical lens 261 may be anchored to the frame 263. The surface of the convex cylindrical lens 261 on the opposite side of the curved surface may be provided with the partially-reflective coating 261a. The surface on which the partially-reflective coating 261a is formed may function as a laser output end of the master oscillator system 20.

A movement mechanism may include, for example, a moving stage 264, a rail 265, a protruding portion 266, and a stepping motor 267. The concave cylindrical lens 262 may be anchored to the moving stage 264. The rail 265 may be anchored to the frame 263 so as to extend along the optical path of the laser light L1. The moving stage 264 may be mounted upon the rail 265 so as to be capable of sliding. The protruding portion 266 may protrude from the moving stage 264. The stepping motor 267 may cause the protruding portion 266 to advance/recede along the direction in which the rail 265 extends. Through this, the concave cylindrical lens 262 upon the moving stage 264 may move along the optical path of the laser light L1. As a result, the distance between the concave cylindrical lens 262 and the convex cylindrical lens 261 may be adjusted.

As shown in FIGS. 21 and 22, the wavefront tuning unit 26 configured as described above can tune the wavefront of the laser light L1 by adjusting the distance between the convex cylindrical lens 261 and the concave cylindrical lens 262.

7. Other

7.1 Amplifying Apparatus

Next, the amplifying apparatus 50 illustrated in FIG. 1 will be described in detail using the drawings. The amplifying apparatus 50 may be an amplifying apparatus of a variety of types, such as a power oscillator, a power amplifier, a regenerative amplifier, or the like. Furthermore, the amplifying apparatus 50 may be a single amplifying apparatus, or may include a plurality of amplifying apparatuses.

7.1.1 Embodiment Including Fabry-Perot Resonator

Figure 23:
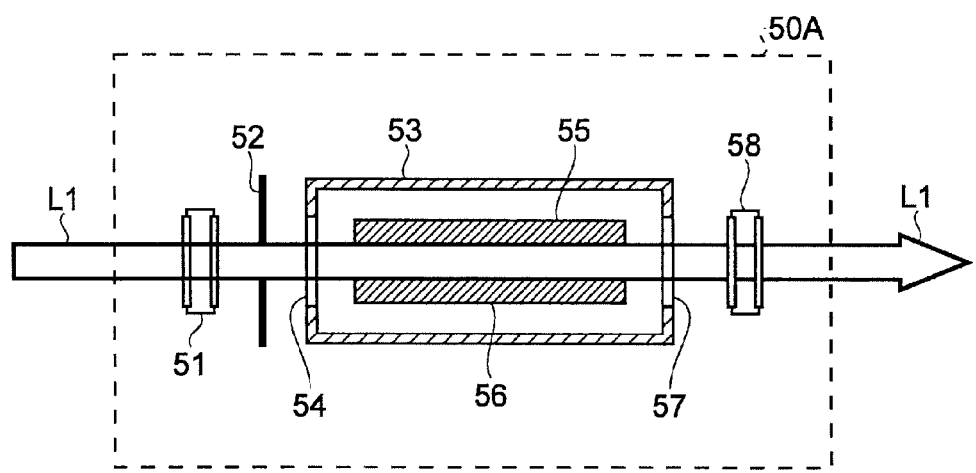
FIG. 23 schematically illustrates the overall configuration of an amplifying apparatus that employs a power oscillator including a Fabry-Perot resonator according to an embodiment.

First, a case where a power oscillator including a Fabry-Perot resonator is used as the amplifying apparatus 50 will be described as an example. FIG. 23 schematically illustrates the overall configuration of an amplifying apparatus 50A that employs a power oscillator including a Fabry-Perot resonator. As shown in FIG. 23, the amplifying apparatus 50A may include a chamber 53. The amplifying apparatus 50A may include a rear mirror 51 that reflects some laser light while allowing some of the laser light to pass, and an output coupler 58 that reflects some laser light while allowing some of the laser light to pass. The rear mirror 51 and the output coupler 58 may form an optical resonator. Here, it is preferable for the reflectance of the rear mirror 51 to be higher than the reflectance of the output coupler 58. The output coupler 58 may serve as an output end for the amplified laser light L1.

The amplifying apparatus 50A may further include a slit 52 that adjusts the beam profile of the laser light L1. Windows 54 and 57 may be provided in the chamber 53. The windows 54 and 57 may allow the laser light L1 to pass through while maintaining the chamber 53 in a sealed state. A gain medium such as an excimer gas may be injected into the chamber 53. The gain medium may include at least one of, for example, Kr gas, Ar gas, F2 gas, Ne gas, and Xe gas. Furthermore, a pair of discharge electrodes 55 and 56 may be provided within the chamber 53. The discharge electrodes 55 and 56 may be disposed on either side of a region through which the laser light L1 passes (an amplification region). A pulsed high voltage may be applied between the discharge electrodes 55 and 56, from a power source (not shown). The high voltage may be applied between the discharge electrodes 55 and 56 in correspondence with the timing at which the laser light L1 passes through the amplification region. When the high voltage is applied between the discharge electrodes 55 and 56, an amplification region containing an activated gain medium can be formed between the discharge electrodes 55 and 56. The laser light L1 can be amplified when passing through this amplification region.

7.1.2 Embodiment Including Ring Resonator

Figure 24:
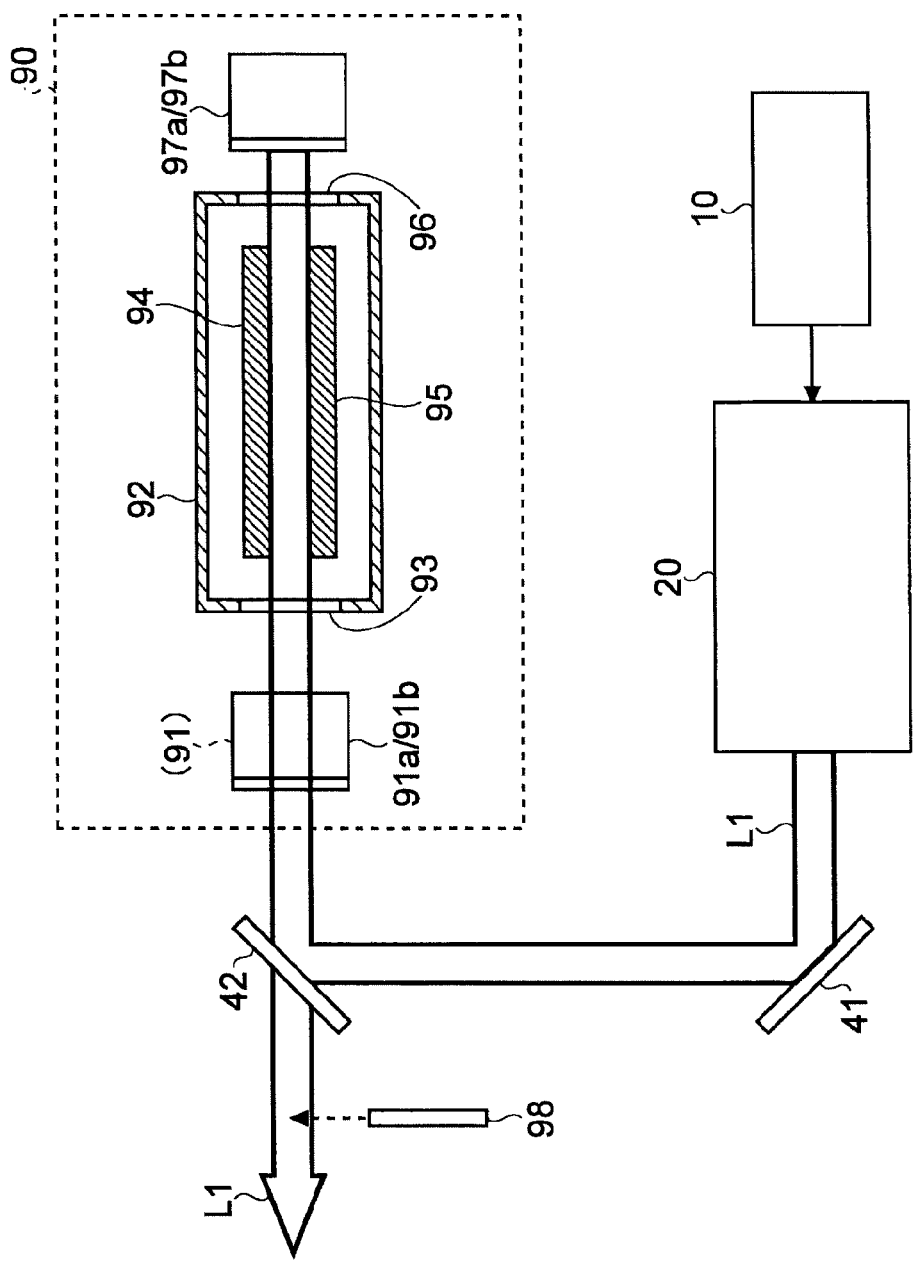
FIG. 24 schematically illustrates the overall configuration of an amplifying apparatus that employs a power oscillator including a ring resonator according to an embodiment.
Figure 25:
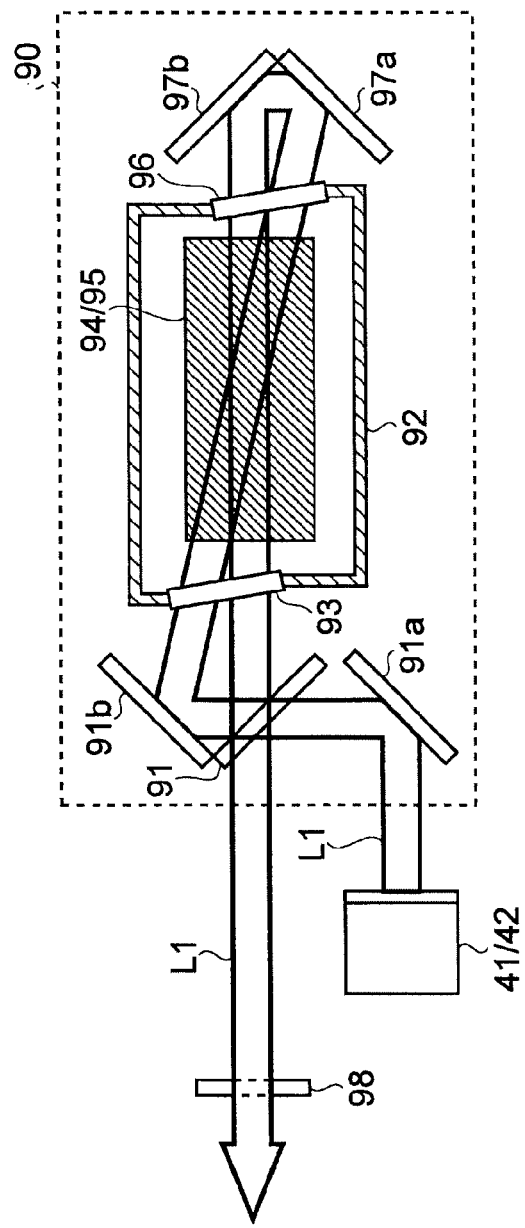
FIG. 25 is a cross-sectional view of the configuration shown in FIG. 24 rotated 90° using the optical path of laser light as an axis.

Next, a case where a power oscillator including a ring resonator is used as the amplifying apparatus 50 will be described as an example. FIGS. 24 and 25 schematically illustrate the overall configuration of an amplifying apparatus 90 that employs a power oscillator including a ring resonator. FIG. 24 is a side view of the amplifying apparatus 90, whereas FIG. 25 is a top view of the amplifying apparatus 90. A shutter 98 that blocks the laser light L1 outputted from the amplifying apparatus 90 may further be provided at the output stage of the amplifying apparatus 90.

As shown in FIGS. 24 and 25, the amplifying apparatus 90 may include high-reflecting mirrors 91a, 91b, 97a, and 97b, an output coupler 91, and a chamber 92. The high-reflecting mirrors 91a, 91b, 97a, and 97b and the output coupler 91 may form multipass through which the laser light L1 passes through the amplification region within the chamber 92 a plurality of times. The output coupler 91 may be a partially-reflecting mirror. The chamber 92 may be disposed in the optical path formed by the high-reflecting mirrors 91a, 91b, 97a, and 97b and the output coupler 91. Note that the amplifying apparatus 90 may further include a slit (not shown) that adjusts the beam profile of the laser light L1 that travels within the amplifying apparatus 90. A gain medium such as an excimer gas may be injected into the chamber 92 so as to fill the amplification region. The gain medium may include at least one of, for example, Kr gas, Ar gas, F2 gas, No gas, and Xe gas.

In the stated configuration, the laser light L1 outputted from, for example, the master oscillator system 20 may enter the amplifying apparatus 90 via a high-reflecting mirror 41 and a high-reflecting mirror 42. The laser light L1 that has entered may enter the chamber 92 via a window 93 after being reflected by the high-reflecting mirror 91a, partially allowed to pass through the output coupler 91, and then reflected by the high-reflecting mirror 91b. The laser light L1 that has entered the chamber 92 may be amplified when passing through an amplification region between two discharge electrodes 94 and 95 where a voltage has been applied. The amplified laser light L1 may be emitted from the chamber 92 through a window 96. The emitted laser light L1 may then once again enter the chamber 92 via the window 96 after being reflected by the high-reflecting mirrors 97a and 97b. After this, the laser light L1 may once again be amplified when passing through the amplification region within the chamber 92. The amplified laser light L1 may be emitted from the chamber 92 through the window 93.

The laser light L1 that has passed through the amplification region within the chamber 92 twice in this manner may then be partially outputted via the output coupler 91. Meanwhile, the remaining laser light that has been reflected by the output coupler 91 may be amplified by once again traveling through an optical path formed by the high-reflecting mirrors 91b, 97a, and 97b and the output coupler 91.

7.2 Spectrum Detector

Next, the spectrum detector 63 illustrated in FIG. 1 will be described.

7.2.1 Monitor Etalon Spectroscope

Figure 26:
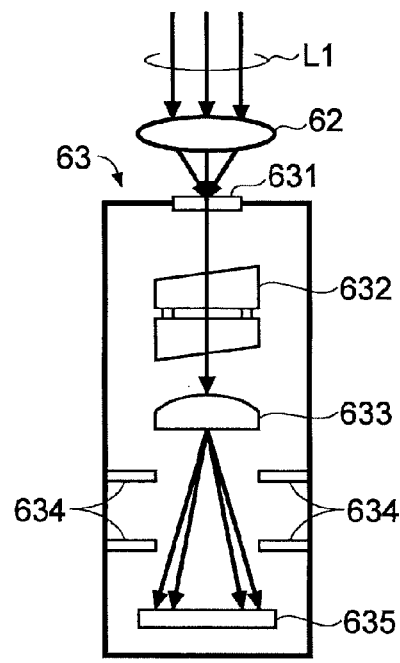
FIG. 26 schematically illustrates the overall configuration of a spectrum detector according to an embodiment.

First, the spectrum detector 63 using a monitor etalon will be described in detail using the drawings. FIG. 26 schematically illustrates the overall configuration of the spectrum detector 63. As shown in FIG. 26, the spectrum detector 63 may include a diffuser plate 631, a monitor etalon 632, a focusing lens 633, and an image sensor 635 (this may be a photodiode array instead).

The laser light L1 that has passed through the focusing lens 62 may first be incident on the diffuser plate 631. The diffuser plate 631 may diffuse the laser light L1 incident thereon. This diffused light may then enter the monitor etalon 632. This monitor etalon 632 may be an air gap etalon in which two mirrors formed by coating the surfaces of substrates through which the laser light L1 passes with a partially reflective film are affixed to each other with a space therebetween so as to form a predetermined gap. The monitor etalon 632 may allow light at a predetermined wavelength from the entering diffused light to pass therethrough. This passing light may be incident on the focusing lens 633. The image sensor 635 may be disposed on the focal surface of the focusing lens 633. The passing light focused by the focusing lens 633 can produce an interference band on the image sensor 635. The image sensor 635 may detect the interference band that has been produced. The square of the radius of the interference band can be in a proportional relationship with the wavelength of the laser light L1. Accordingly, the overall spectrum of the laser light L1 can be detected from the detected interference band. The spectral bandwidth, peak intensity and wavelength may be found based on the detected spectrum using an information processing apparatus (not shown), or may be calculated by the controller 10.

A light-blocking plate 634 may be provided between the focusing lens 633 and the image sensor 635. This makes it possible to reduce stray light and detect the interference band with a high degree of accuracy.

7.2.2 Grating-Type Spectroscope

Figure 27:
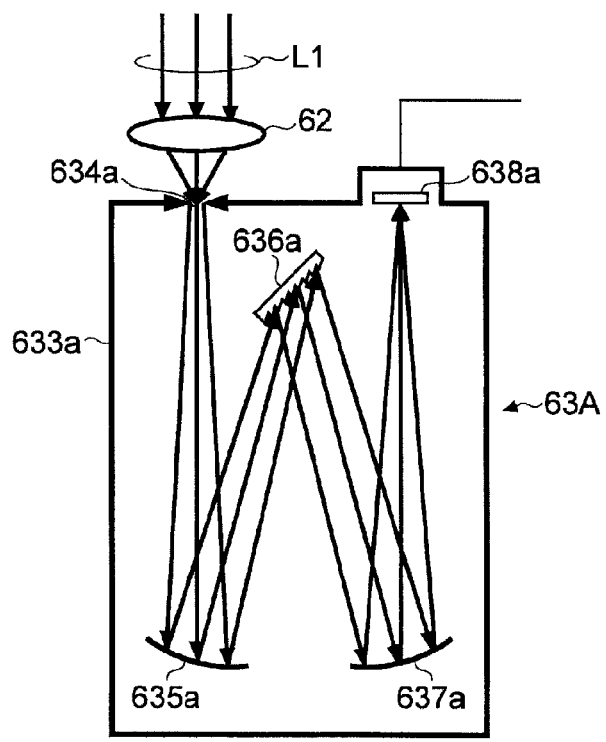
FIG. 27 schematically illustrates another overall configuration of a spectrum detector according to an embodiment.

Next, a spectrum detector 63A using a grating-type spectroscope will be described in detail using the drawings. FIG. 27 schematically illustrates the overall configuration of the spectrum detector 63A. As shown in FIG. 27, the spectrum detector 63A may include a diffuser plate (not shown) and a spectroscope 633a. The spectroscope 633a may include a concave mirror 635a, a grating 636a, a concave mirror 637a, and an image sensor (line sensor) 638a.

The laser light L1 may first be incident on the diffuser plate. The diffuser plate may diffuse the laser light L1 incident thereon. This diffused light may be incident on the focusing lens 62. A light entry slit 634a of the spectroscope 633a may be disposed in the vicinity of the focal surface of the focusing lens 62. The light entry slit 634a may be located slightly upstream from the focal surface of the focusing lens 62. The diffused light focused by the focusing lens 62 may be incident on the concave mirror 635a via the light entry slit 634a. The concave mirror 635a may convert the diffused light incident thereon into approximately parallel light and reflect that light. This reflected light may then be incident on the grating 636a. The grating 636a may diffract the approximately parallel light incident thereon. This diffracted light may be incident on the concave mirror 637a. The concave mirror 637a may reflect the diffracted light incident thereon so as to focus that light. The image sensor 638a may be disposed on the focal surface of the concave mirror 637a. In this case, the reflected light focused by the concave mirror 637a can form an image on the image sensor 638a. The image sensor 638a may detect the light intensity distribution at the location where the image is formed. The location where the image of the reflected light is formed can be in a proportional relationship with the wavelength of the laser light L1. Accordingly, the overall spectrum of the laser light L1 can be detected from the detected location where the image is formed. The spectral bandwidth, peak intensity and wavelength may be found based on the detected spectrum using an information processing apparatus (not shown), or may be calculated by the controller 10.

7.3 Spectral Bandwidth E95

Figure 28:
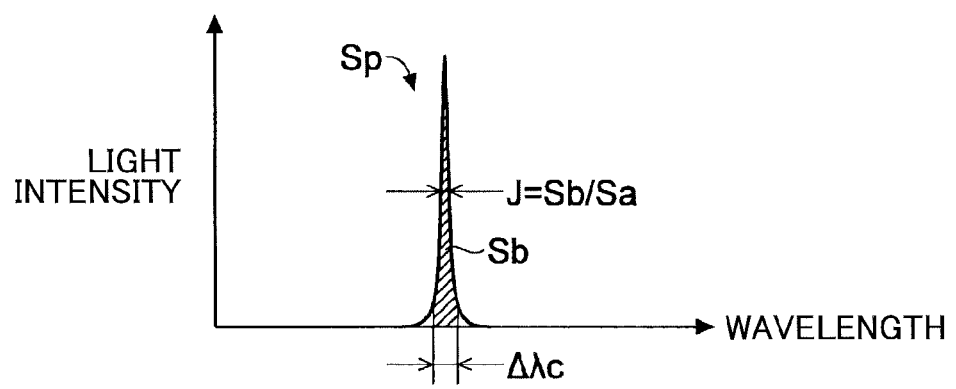
FIG. 28 is a diagram illustrating a spectral bandwidth E95.

Here, the spectral bandwidth E95 will be described using FIG. 28. As shown in FIG. 28, assuming that the light energy of an overall spectrum Sp is Sa and the light energy contained in a bandwidth $\Delta\lambda c$ is Sb, the spectral bandwidth E95 can be defined as the bandwidth $\Delta\lambda c$ at which a spectral bandwidth J expressed by the following Formula (1) is 95%.

$$J = Sb/Sa \quad (1)$$

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the indefinite article "a" or "an" as used in the present specification and the scope of the appended claims should be interpreted as meaning "at least one" or "one or more".

What is claimed is:

1. A master oscillator system comprising:
   a grating that functions as one of a plurality of resonator mirrors in an optical resonator;
   an optical element disposed within an optical path between said plurality of resonator mirrors; and
   an attitude control mechanism that adjusts the attitude of said optical element,
   wherein said optical element is a prism; and
   wherein said attitude control mechanism adjusts the attitude of said prism so that an axis at which two surfaces, a surface into which laser light is input and a surface from which the laser light is output, in said prism intersect is tilted around a rotational axis which is parallel to one of an upper face and a bottom face of said prism.

2. The master oscillator system according to claim 1, wherein said attitude control mechanism adjusts an entry angle of laser light that is incident on said grating within said optical resonator.

3. The master oscillator system according to claim 1, further comprising:
   a beam width tuning unit that tunes the beam width of laser light incident on said grating within said optical resonator.

4. The master oscillator system according to claim 3, wherein said beam width tuning unit includes one or more beam width tuners and a movement mechanism capable of selectively inserting and removing the one or more beam width tuners into and from the optical path of the laser light transmitted within said optical resonator.

5. The master oscillator system according to claim 4, wherein each beam width tuner has one or more prisms serving as said optical element;
   said movement mechanism selectively inserts and removes at least one of said one or more prisms into and from said optical path; and
   said attitude control mechanism adjusts the attitude of at least one of said one or more prisms.

6. The master oscillator system according to claim 1, further comprising:
   an amplifier that amplifies laser light transmitted within said optical resonator.

7. A laser apparatus comprising:
   the master oscillator system according to claim 1; and
   an amplifying apparatus that amplifies laser light outputted from said master oscillator system.

* * * * *